US006594785B1

(12) United States Patent
Gilbertson et al.

(10) Patent No.: US 6,594,785 B1
(45) Date of Patent: Jul. 15, 2003

(54) SYSTEM AND METHOD FOR FAULT HANDLING AND RECOVERY IN A MULTI-PROCESSING SYSTEM HAVING HARDWARE RESOURCES SHARED BETWEEN MULTIPLE PARTITIONS

(75) Inventors: Roger L. Gilbertson, Minneapolis, MN (US); Mitchell A. Bauman, Circle Pines, MN (US); Penny L. Svenkeson, Forest Lake, MN (US); James L. DePenning, Eagan, MN (US); Michael L. Haupt, Roseville, MN (US); Donald Kalvestrand, Lansdale, PA (US); Daniel S. Tokoly, Huntingdon Valley, PA (US); Frederick G. Fellenser, Paoli, PA (US); Maria A. Liedman, Arlington, MA (US)

(73) Assignee: Unisys Corporation, Blue Bell, PA (US)

( * ) Notice: Subject to any disclaimer, the term of this patent is extended or adjusted under 35 U.S.C. 154(b) by 0 days.

(21) Appl. No.: 09/561,270

(22) Filed: Apr. 28, 2000

(51) Int. Cl.[7] .................................................. H02H 3/05
(52) U.S. Cl. .......................................... 714/48; 714/31
(58) Field of Search ............................. 714/5, 8, 9, 10, 714/31, 44, 48; 711/145, 152

(56) References Cited

U.S. PATENT DOCUMENTS

| 5,327,550 | A | * | 7/1994 | Pribnow ........................ 714/39 |
| 5,550,973 | A | * | 8/1996 | Forman et al. ................ 714/10 |
| 5,568,609 | A | * | 10/1996 | Sugiyama et al. ............ 714/43 |
| 5,634,037 | A | * | 5/1997 | Sasaki et al. ................ 711/152 |
| 5,761,413 | A | * | 6/1998 | Frank et al. .................. 714/49 |
| 6,014,756 | A | * | 1/2000 | Dottling et al. ............... 714/15 |
| 6,067,634 | A | * | 5/2000 | Nelson ........................... 714/4 |
| 6,199,179 | B1 | * | 3/2001 | Kauffman et al. ............ 714/26 |
| 6,381,681 | B1 | * | 4/2002 | McCracken et al. ........ 711/152 |
| 6,401,223 | B1 | * | 6/2002 | DePenning ................... 714/42 |
| 2001/0052054 | A1 | * | 12/2001 | Franke et al. ............... 711/147 |

* cited by examiner

Primary Examiner—Robert Beausoliel
Assistant Examiner—Gabriel L. Chiu
(74) Attorney, Agent, or Firm—Michael B. Atlass; Mark T. Starr

(57) ABSTRACT

Poisoning of specific memory locations as a process when a part of a multiprocessor computer system becomes faulty leads to ability to isolate specific data owned by individual failing units even in a shared memory area. Also continuous processing by non-failing units is allowable. A support processor handles non-immediate problems and allows resetting of memory locations formerly owned by failed units.

33 Claims, 12 Drawing Sheets

Symmetrical Multiprocessing Platform

*Processing Module (POD)*

Sub-Processing Module (Sub-POD)

Memory Storage Unit (MSU)

Memory Controller (MCA)

SYSTEM AND METHOD FOR FAULT HANDLING AND RECOVERY IN A MULTI-PROCESSING SYSTEM HAVING HARDWARE RESOURCES SHARED BETWEEN MULTIPLE PARTITIONS

CROSS-REFERENCE TO OTHER APPLICATIONS

The following co-pending applications of common assignee contain some common disclosure:

"System and Method for By-Passing Supervisory Memory Intervention for Data Transfers Between Devices Having Local Memories", filed Dec. 22, 1998, Ser. No. 09/218,811, incorporated herein by reference in its entirety;

"System for Reducing the Number of Requests Presented to a Main Memory in a Memory Storage System Employing a Directory-Based Cache Scheme", filed May 28, 1999, Ser. No. 09/322,405, incorporated herein by reference in its entirety;

"A Directory-Based Cache Coherency System", filed Nov. 05, 1997, Ser. No. 08/965,004, incorporated herein by reference in its entirety;

"Cache-Level Return Data By-Pass System for a Hierarchical Memory", filed Dec. 20, 1999, Ser. No. 09/468,050, incorporated herein by reference in its entirety;

"Directory-Based Cache Coherency System Supporting Multiple Instruction Processor and Input/Output Caches", filed Dec. 31, 1997, Ser. No. 09/001,598, incorporated herein by reference in its entirety; and "Computer System and Method for Operating Multiple Operating Systems in Different Partitions of the Computer System and for Allowing the Different Partitions to Communicate with One Another Through Shared Memory", filed Jul. 23, 1999, Ser. No. 09/120,797, incorporated herein by reference in its entirety.

BACKGROUND OF THE INVENTION

1. Field of the Invention

This invention relates generally to an improved system and method for performing fault recovery within a Symmetrical Multi-Processor (SMP) system having multiple processing partitions; and more particularly, relates to a system and method for isolating and handling faults within a failing partition in a manner that prevents the fault from creating a failure in a second, non-failing partition that shares at least one main memory segment with the failing partition.

2. Description of the Prior Art

Data processing systems are becoming increasing complex. Some systems, such as Symmetric Multi-Processor (SMP) computer systems, couple two or more Instruction Processors (IPs) and multiple Input/Output (I/O) Modules to shared memory. This allows the multiple IPs to operate simultaneously on the same task, and also allows multiple tasks to be performed at the same time to increase system throughput.

As the number of units coupled to a shared memory increases, more demands are placed on the memory and memory latency increases. To address this problem, high-speed cache memory systems are often coupled to one or more of the IPs for storing data signals that are copied from main memory. These cache memories are generally capable of processing requests faster than the main memory while also serving to reduce the number of requests that the main memory must handle. This increases system throughput.

Problems result where one or more of the system's processors, instruction processors or I/O processors (hereafter referred to as processors and I/Os or processor units and I/O units), has an error, and that error is capable of corrupting an area of the main memory or any other memory that is or may be shared with other still-operating processors or I/Os. Losing the entire shared memory area for all the processors when only one or a small number are failing or involved with a failure of some kind is problematic for the steady state performance and overall throughput of the computer system. Accordingly, addressing this concern is a priority in computer systems where continuous or maximizing throughput is a requirement.

The system the invention developed for and of the preferred embodiment is a Symmetrical Multi-Processor (SMP) System (sometimes called a Cellular Multi-Processing (CMP) system) that is capable of being partitioned into multiple, independent data processing systems. That is, the hardware of the System may be sub-divided into multiple processing partitions. Each of the partitions includes or comprises predetermined processors, processor caches, peripheral devices, and portions of the main memory associated or dedicated to the partition. A dedicated Operating System (OS) controls the hardware associated to the partition. Hardware interfaces are configured appropriately within the system to ensure that messages and data are only passed between the processors and peripheral devices within the same partition. Processing occurs within a partition relatively independently of processing that is being performed in any other partitions. Communication between partitions may occur using shared address ranges within the main memory. The specific mechanisms used to accomplish this communication are described in detail in the U.S. Patent Application entitled "Computer System and Method for Operating Multiple Operating Systems in Different Partitions of the Computer System and for Allowing the Different Partitions to Communicate with One Another Through Shared Memory", referenced above.

By assigning a shared address range to multiple partitions of a data processing system, processors within different partitions may communicate efficiently. This is desirable when multiple partitions are performing related tasks. Alternative mechanisms of communication involve messages sent through input/output devices, and do not provide the throughput that a shared-memory scheme offers. However, utilizing shared memory presents unique problems related to error recovery. If a unit within a first partition fails such that main memory data that is shared between the first partition and a second partition is corrupted, the second (non-failing) partition may also experience a fault. This makes the entire data processing system less robust.

Another complication associated with the system of the preferred embodiment involves the use of write-back, versus store-through, caches. When write-back caches are employed, a copy of any data that is updated within a processor cache is not immediately stored back to main memory. The only copy of the updated data resides within the cache until the processor flushes the cached memory segment back to the main memory. Therefore, a failure within a partition may cause the only copy of valid memory data to be lost. To minimize this risk, it is important to allow all memory operations initiated by a partition prior to the occurrence of a fault to complete, even though subsequent operations will be abandoned to prevent corruption of system data.

One way to handle errors that affect memory data residing within a range of main memory shared between multiple partitions involves designating all shared data as unusable by both partitions. Although this recovery mechanism is relatively straight-forward to implement, it may result in the loss of a memory range that is critical to applications running on the non-failing partition. This approach does not provide a resilient error recovery mechanism.

Another mechanism for handling this problem involves allowing main memory to process memory requests following the issuance of a fault notification. According to this method, main memory determines, based on the receipt of an error indication, which memory requests should be serviced and which should be discarded. Because of latency between the detection of errors within the various units of the partition and the receipt of an error indication at the main memory, it may be difficult for the memory logic to determine which memory requests to process and which to discard. This may ultimately result in corruption of memory data. Moreover, by the time requests have been received by the memory, requests from the failing unit have already entered resources such as memory queues that are shared between the failing and non-failing partitions. This makes the process of determining which requests to process and which to discard more complex.

What is needed, therefore, is a system and method for recovering from an error within a first partition without affecting a second partition that shares main memory segments with the failing partition. The system and method should isolate errors as close to the failure as possible so that requests that are unaffected by the fault may be processed while requests made after the failure indication is received may be discarded.

SUMMARY OF THE INVENTION

In general, this invention provides an improved Symmetrical Multi-Processor (SMP) data processing systems and is particularly related to SMP systems having improved fault-handling capabilities. The invention is particularly geared toward providing a fault handling system for a multi-partition data processing system having multiple partitions that communicate via a shared main memory. Different forms of fault can call for variation in the process of fault handling and recovery in such systems. Elements of the invention provide for variable recovery with a goal of reducing or eliminating corruption of memory data and resilient error recovery. The kinds of errors or faults tracked by this system can be thought of as critical errors because they indicate unreliability of the system having the fault.

The present invention is particularly applicable to a hierarchical, multi-level, memory system that keeps track of all cache lines of data in a main memory, whether the owner of a cache line is in a local processor's cache away from the main memory or not, and whether the main memory is distributed across multiple Main Storage Units, each subdivided into "memory clusters", as in the preferred embodiment or not.

(Main Storage Units are also called MSUs, and each MSU in the preferred embodiment may be populated with up to 4 "memory clusters", and as is shown these are organized into a main memory system in the preferred embodiment SMP system. A "cache line" is a unit in the preferred embodiment representing 64 bytes, although any organizational unit size into which a computer system's main memory is organized could be employed. In our case, because the memory is organized into 64 byte sized chunks, i.e., cache lines, each of these has a directory entry, and 64 bytes is the size of a typical unit in which information is moved in our preferred embodiment system.)

The system should have an ability to mark the ownership state for each cache line through the tracking system (preferably a memory directory structure). In addition, the system needs to have the ability to mark each cache line as valid or invalid. The memory that keeps track of this is called a directory, and is described in U.S. Patent Application entitled "A Directory-Based Cache Coherency System", referenced above. The directory of the preferred embodiment is stored in the main memory. This record keeping allows for a more satisfactory decommissioning of bad processing units, I/O units, and allows for some continuing use of shared memory where some system processors that share the memory have not failed.

More specifically, with a system for tracking all the memory units, (preferably cache lines) and where copies may reside and be valid throughout the SMP architecture, it becomes possible to isolate the errors as close in time to a failure as possible so that requests which are not affected by the fault may be processed, while requests made after the failure indication is received may be safely discarded. Also, by tracking the validity of every cache line in the system, shared memory partitions need not be entirely discarded, and failure of a single processor processor or I/O which may share a partition in memory need not cause other processors which may share that partition to go down.

A support processor preferably monitors the error condition of the system, and can assist in the replacement of downed processing and I/O units while other processing units and I/O units that may have shared a memory partition with the downed elements continue to operate normally without interruption so long as they have no need for cache lines owned by the downed elements, and possibly even in some instances where they do.

A process for "poisoning" the cache lines owned by elements that need to be downed because of faults is described, and the system to implement it detailed. Errors detected by the elements themselves, or by the interfacing logic connecting the processing elements to the main memory system, are reported through a reporting system to the main memory system which poisons all cache lines (that is, indicates they are invalid) owned by the failing elements of the computer system, and for which have requests currently pending in the request path to main memory. The main memory system continues to poison cache lines as required when new requests for cache lines, owned by failed system processors, are issued by operational system processors. Errors are detailed in a register readable by a support processor that initiates further actions to ensure all cache lines owned by the failed elements are poisoned (because the operational requesters may not access all possible lines, for an indeterminate time). The support processor may provide further assistance in recovery for the non-failing elements that share the memory partition with the failing elements.

In the preferred embodiments the computer system processing elements are grouped into PODS, (Processing Modules) with 2 Sub-POD processor units, each of which can contain 4 processors, and 2 I/O modules, each of which contains 3 PCI Bus interfaces for connection to PCI devices. In this configuration a set of 4 error indicators is maintained for each of the POD requester ports (2 Sub-PODs and 2 I/O modules), within the POD's "TCM" system. The TCM acts as a crossbar interconnect, to communicate across the 4 requester ports with 4 MSUs. An additional error indicator is kept for the TCM.

Faults that are critical are detected and reported via hardware initiated functioning. The hardware notifies the support processor of the event with a fault report. Hardware initiated functioning performs cache line poisoning for currently pending requests in the system, to cache lines owned by failed processing elements. The hardware continues to poison more cache lines as required by new requests that are received. Support processor initiated functioning forces fetch requests to the entire memory range shared by failed and operational requesters. This ensures that the hardware will see a fetch request for every possible cache line owned by a failed requester, within the entire shared memory range.

Failure of a subunit of the POD will cause only those cache lines owned by the failing subunit to be poisoned. The cache lines will be marked as "poisoned" in the directory (preferable maintained by the main memory system). Failure of a TCM (POD) unit causes all ports from that POD to be considered failed and all cache lines owned by the POD's processors and I/O to be marked as poisoned. In either event all functional parts of the SMP computer system continue to function while the fault handling is active. Operational processing elements that request a fetch of a poisoned cache line are notified of the poisoned state via an indication in the fetch response from the memory system. Appropriate recovery actions on a request basis may therefore be possible, but are beyond the scope of this invention.

Depending on the severity of the fault, the support processor may have to stop the failed partition, or may initiate actions to down (drop) a failing processing element from a partition that continues to function. As long as the fault is not associated with a particular MSU within memory system itself, the remaining partitions continue to function. The support processor also provides diagnostic information to allow efficient repair of the downed elements and for their expeditious replacement.

When the replacement hardware is installed, and/or a failed partition is restarted, the support processor is used to initiate actions to introduce replacement hardware into a partition and to restart partition(s) stopped due to the failure. If the same MSU hardware remains in the system, the support processor may also initiate actions to reclaim the poisoned memory range at this time. The memory range may be reclaimed for the new partition or be made available to other partitions. Specific support processor methods and any alternatives are beyond the scope of this invention.

The foregoing system provides a mechanism for recovering ranges of memory that are shared between multiple processing one or more failing units executing within a first processing partition, and one or more other operational units executing within a second processing partition. The recovery is performed in a manner that allowed the units within the second partition to continue operating despite the fault. The recovery mechanism is designed to render operational as much of the shared memory range as possible.

Still other objects and advantages of the present invention will become readily apparent to those skilled in the art from the following detailed description of the preferred embodiment and the drawings, wherein only the preferred embodiment of the invention is shown, simply by way of illustration of the best mode contemplated for carrying out the invention. As will be realized, the invention is capable of other and different embodiments, and its several details are capable of modifications in various respects, all without departing from the invention. Accordingly, the drawings and description are to be regarded to the extent of applicable law as illustrative in nature and not as restrictive.

BRIEF DESCRIPTION OF THE FIGURES

The present invention will be described with reference to the accompanying drawings.

DETAILED DESCRIPTION OF THE PREFERRED EMBODIMENTS

Before describing the preferred embodiment of the present invention, a discussion of the system design, including the memory coherency scheme, that is associated with the current data processing system is provided as background information.

Preferred Embodiment System Platform

Figure 1:
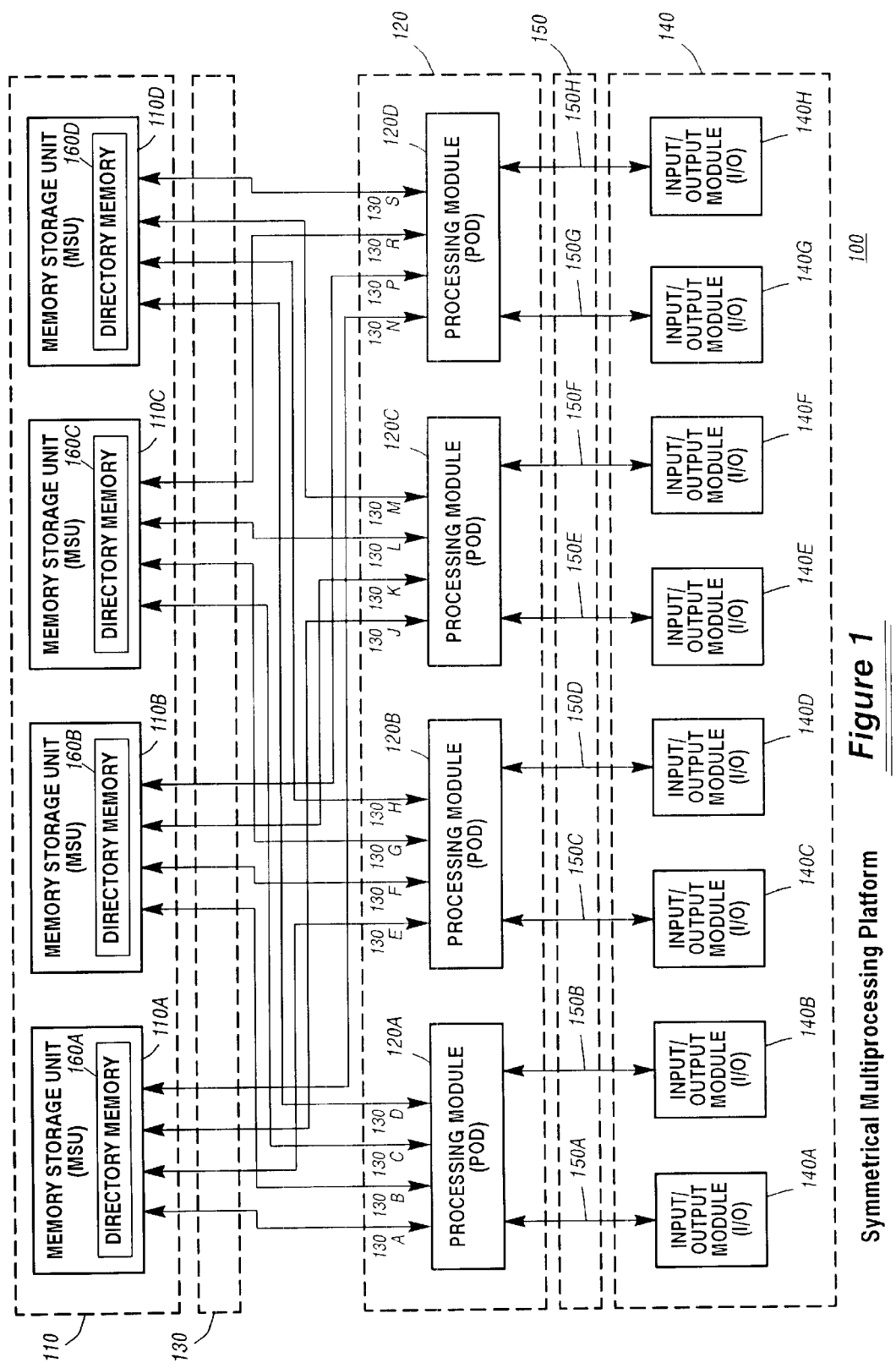
FIG. 1 is a block diagram of a Symmetrical Multi-Processor (SMP) System Platform according to a preferred embodiment of the present invention.

FIG. 1 is a block diagram of a Symmetrical Multi-Processor (SMP) System Platform according to a preferred embodiment of the present invention. System Platform 100 includes one or more Memory Storage Units (MSUs) in dashed block 110 individually shown as MSU 110A, MSU 110B, MSU 110C and MSU 110D, and one or more Processing Modules (PODs) in dashed block 120 individually shown as POD 120A, POD 120B, POD 120C, and POD 120D. Each unit in MSU 110 is interfaced to all PODs 120A, 120B, 120C, and 120D via a dedicated, point-to-point connection referred to as an MSU Interface (MI) in dashed block 130, individually shown as 130A through 130S. For example, MI 130A interfaces POD 120A to MSU 110A, MI 130B interfaces POD 120A to MSU 110B, MI 130C interfaces POD 120A to MSU 110C, MI 130D interfaces POD 120A to MSU 110D, and so on.

The MSU provides the main storage facility of Platform 100. In the system of the preferred embodiment, a directory-based coherency scheme is used, as is described in detail in the co-pending application entitled "Directory-Based Cache Coherency System Supporting Multiple Instruction Processor and Input/Output Caches". According to this scheme, state information is used to describe each addressable unit, or "cache line", of main storage in the MSU 110, wherein the preferred embodiment utilizes cache lines that are sixty-four bytes in length. This state information, which is stored in storage devices shown as Directory Memories 160A–160D, records which of the unit(s) within Platform 100 stores the most recent copy of each of the MSU cache lines. Thus, every cache line of the MSU has an entry in the MSU directory that stores state information about its current condition at, essentially, all times. This is discussed further below. It should also be noted that Directory Memory entries for each bad cache line will be marked as "poisoned" to track faults, as described in detail later. Thus, a not insignificant overhead of system memory and resources is devoted to keeping track of this information.

In one embodiment of the present invention, MI 130 comprises separate bi-directional data and bidirectional address/command interconnections, and further includes unidirectional control lines that control the operation on the data and address/command interconnections (not individually shown).

System Platform 100 further comprises Input/Output (I/O) Modules in dashed block 140 individually shown as I/O Modules 140A through 140H. Each I/O Module includes multiple I/O channels, each channel to couple to a respective peripheral device. Each I/O Module 140 is connected to one of the PODs across a dedicated point-to-point connection called an MIO Interface. The MIO Interfaces are shown in dashed block 150 as 150A through 150H. The MIO Interfaces 150 are similar to the MI Interfaces 130, but in the preferred embodiment have a different predetermined transfer rate.

Processing Module (POD) of the System Platform

Figure 2:
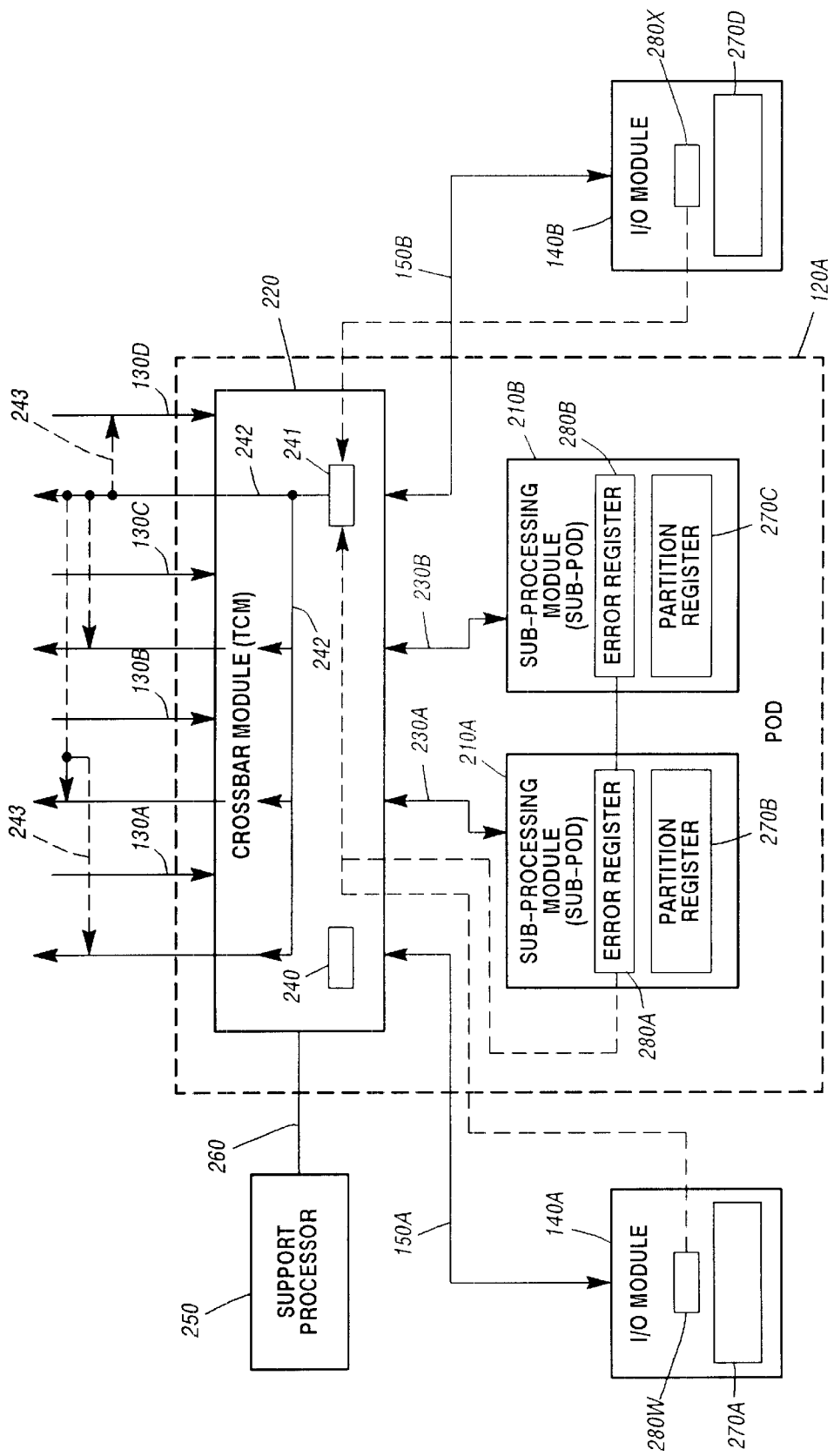
FIG. 2 is a block diagram of a processing module (POD) according to one embodiment of the present invention.

FIG. 2 is a block diagram of a processing module (POD) according to one embodiment of the present invention. POD 120A is shown and described, but each of the PODs 120A through 120D has a similar configuration. POD 120A includes two Sub-Processing Modules (Sub-PODs) 210A and 210B. Each of the Sub-PODs 210A and 210B are interconnected to a Crossbar Module (TCM) 220 through dedicated point-to-point Sub-POD Interfaces 230A and 230B, respectively, that are similar to the MI interconnections 130. TCM 220 further interconnects to one or more I/O Modules 140 via the respective point-to-point MIO Interfaces 150. TCM 220 buffers data and address signals, and also functions to route these signals between the Sub-POD Interfaces 230A and 230B, the MIO Interfaces 150A and 150B, and the MI Interfaces 130A through 130D. The manner in which signals are routed is determined by the address provided by the I/O Module or the Sub-POD, respectively. In general, the TCM maps one-fourth of the memory address space to each of the MSUs 110A–110D.

The TCM 220 includes a set of Range Registers for each of the interfacing units, including a set for each of I/O Modules 140A and 140B, and Sub-PODs 210A and 210B. The set of Range Registers 240 is shown for the interface associated with I/O Modules 140A, but a like set is provided for the other I/O Module and each of the two Sub-PODs 210. These registers are loaded at system initialization time to indicate which ranges of main memory in the MSU 110 are available to the respective unit. For example, the set of Range Registers 240A is initialized with memory address values to indicate which ranges of memory will be accessible to I/O Module 140A. The Range Registers are initialized to reflect the memory range assigned to the partition in which the associated unit resides. For example, assume I/O Module 140A has been assigned to a particular processing partition X in a manner to be discussed further below. Further assume that this partition will be assigned the memory address ranges A–B and C–D within the MSU 110 wherein A, B, C, and D are addresses mapped to MSU 110. The set of Range Registers 240 for I/O Module 140A may therefore be initialized to reflect the full partition address ranges A–B and C–D, or a sub-set of these address ranges. This indicates the memory ranges within MSU 110 to which I/O Module 140A may gain access. Any requests made by I/O Module to MSU 110 will be mapped to these allocated memory ranges using address translation logic (not shown) within the TCM, and which is discussed in detail in U.S. patent application Ser. No. 09/120,797, referenced above.

As noted previously, partitions may share portions of main memory such that a portion of the memory allotted to partition X may be shared with partition Y. This will be discussed further below.

The Range Registers are initialized by Support Processor 250. Support Processor 250 is coupled to each of the TCMs 220 of Platform 100 via a Scan Interface 260. In the preferred embodiment, Scan Interface is a high-speed serial scan interface that complies with IEEE TAP Linker Specification 1149.1, allowing communications to occur between the TCMs and the Support Processor. Although for simplicity FIG. 2 shows this Scan Interface 260 only extending between Support Processor and TCM 220 of POD 120A, it will be understood this serial interface is coupled to every I/O Module 140, Sub-POD 210, MSU 110, and TCM 220 in Platform 100. As in known in the art, Support Processor 250 uses Scan Interface 260 to write various serial scan registers, including Range Registers 240, to an initialization state during system initialization, system reset, or system re-configuration. Support Processor 250 may further use this Scan Interface to read the contents of various serial scan registers (which may be contiguous with Range Registers 240, and which may advantageously for this invention include error data, but which are not shown separately from register 240) within Platform 100 to confirm system configuration, to determine hardware availability, or to perform fault analysis. The use of Scan Interface 260 will be discussed further below.

Other registers initialized by Support Processor 250 include Partition Registers 270A, 270B, 270C and 270D. These registers are loaded at initialization time, and may be re-loaded any time Platform 100 is re-partitioned to indicate the partition in which the respect unit resides. For example, Partition Register 270A is set to indicate the partition in which I/O Module 140A resides. Likewise, Partition Register 270B stores a partition indicator to indicate the partition in which the units included in Sub-POD 210A reside. The partition indicators stored in the Partition Registers 270 are used to ensure that units within a particular partition only respond to requests and messages from other units in the same partition. According to the preferred embodiment, Platform 100 may only be partitioned such that all peripheral devices associated with an I/O Module 140 are in the same partition, and all units included within a Sub-POD are likewise included in the same partition.

Further, within the preferred embodiment described by FIG. 2, a system of reporting registers to indicate that a failed requester may be present are shown, including blocks 280a, 280b, 280w and 280x, each of which should have at least one bit of data indicating a condition of fault for the unit 210A, 210B, 140A, and 140B, respectively. Also part of this system is a similar reporting register 241, which in the preferred embodiment will contain an error bit for each requester serviced by the TCM. Each requester error bit in register 241 represents the OR condition of the requester fault (280a, 280b, 280w, and 280x) with a corresponding internally discovered requester interface fault by the TCM, for each interface (230A, 230B, 150A, and 150B). Register 241 also contains 1 bit to represent an internally discovered error condition for the TCM itself. The contents of this error register are fed to the MSU ports, preferably with a hard line output separate from the port channel through the crossbar, but in less preferred embodiments the fault data could be reported across the port itself The operation of the system in the most preferred embodiment continually reports across two hard lines, one for the current condition of the TCM unit itself, and the second bit-serially scanning through a 6 clock-cycle pattern; cycle1=start, cycle2=error condition for Sub-POD 210A (280a/interface 230A), cycle3=error condition for Sub-POD 210B (280b/interface 230B), cycle4=error condition for I/O module 140A (280w/interface 150A), cycle5=error condition for I/O module 140B (280x/interface 150B), cycle6=stop, and then a start cycle begins the next 6-cycle pattern. Clearly, more lines could be used to transfer all this data in parallel each clock cycle if desired, or if the port can be trusted, the data could simply be transferred through the port itself, or an extra line or 5 in each port, but the just described compromise in design is preferred in the present system.

Sub-Processing Module of the POD of the System Platform

Figure 3:
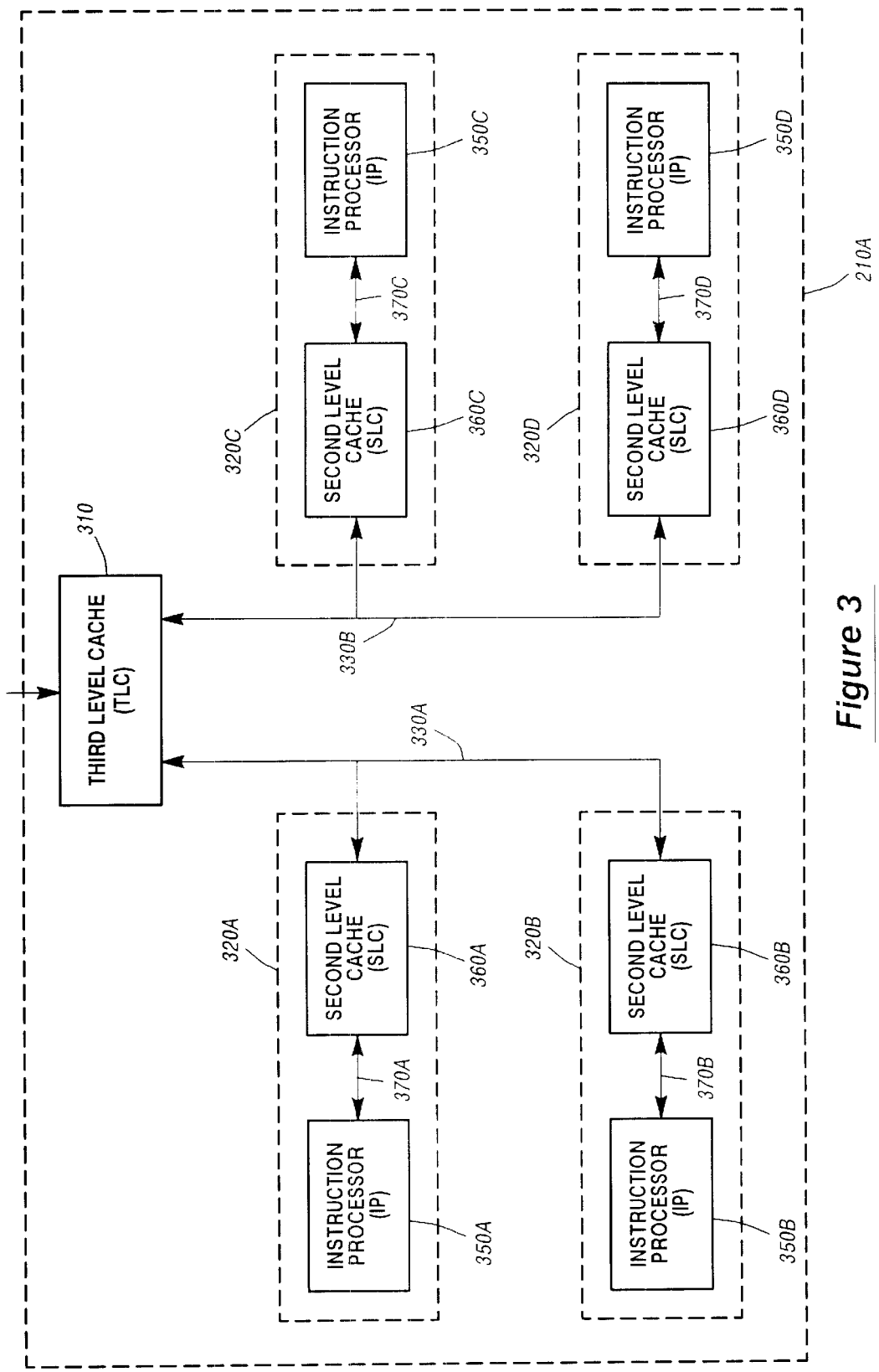
FIG. 3 is a block diagram of a Sub-Processing Module (Sub-POD) according to one embodiment of the present invention.

FIG. 3 is a block diagram of a Sub-Processing Module (Sub-POD) 210 according to one embodiment of the present invention. Sub-POD 210A is shown and described, but it is understood that all Sub-PODs 210 have similar structures and interconnections. In this embodiment, Sub-POD 210A includes a Third-Level Cache (TLC) 310 and one or more Coherency Domains 320 (shown as Coherency Domains 320A, 320B, 320C, and 320D). TLC 310 is connected to Coherency Domains 320A and 320B via Bus 330A, and is connected to Coherency Domains 320C and 320D via Bus 330B. TLC 310 caches data from the MSU, and maintains data coherency among all of Coherency Domains 320, guaranteeing that each processor is always operating on the latest copy of the data.

Each Coherency Domain 320 includes an Instruction Processor (IP) 350 (shown as IPs 350A, 350B, 350C, and 350D), and a Second-Level Cache (SLC) 360 (shown as SLC 360A, 360B, 360C and 360D.) Each SLC interfaces to an IP via a respective point-to-point Interface 370 (shown as Interfaces 370A, 370B, 370C, and 370D), and each SLC further interfaces to the TLC via a respective one of Bus 330A or 330B. Each SLC caches data from the TLC as requested by the interconnecting IP 350.

IP 350 and SLC 360 may be integrated in a single device, such as in a Pentium Pro® processing device available from the Intel Corporation. Alternatively, the IP 350 may be an A-Series Instruction Processor or a 2200-Series Instruction Processor, both commercially available from the Unisys Corporation. In this embodiment, the IP 350 is externally coupled to an SLC 360. Additionally, other brands of processors can be used with the inventive features described herein as will be apparent to those of skill in these arts.

In the preferred embodiment, IP 350 includes an internal First Level Cache. In other embodiments of the present invention, IPs 350 may each utilize an external FLC or not include an FLC at all. Furthermore, in other embodiments of the present invention, each Coherency Domain 320 may includes more successive levels of cache so that multiple caches exist between TLC 310 and IP 350.

All caches of a Sub-POD 310 are write-back, or post-write, caches. This means that data updates residing in any of the caches are not copied to the next hierarchical level in memory at the time the update is made. Instead, the updates remain stored in the cache until a cache flush is performed, or until a memory coherency operation is performed. For example, updates made by IP 350A to SLC 360A reside within SLC 360A until that cache ages the data out of memory to the TLC 310 or to the MSU 110. Updated data is not copied immediately from SLC 360A to the TLC 310 as would occur if a store-through cache were employed. As a result, at any given point in time, the only valid copy of updated memory data may reside within a single cache memory.

Memory Storage Unit of the Preferred Embodiment System Platform

Figure 4:
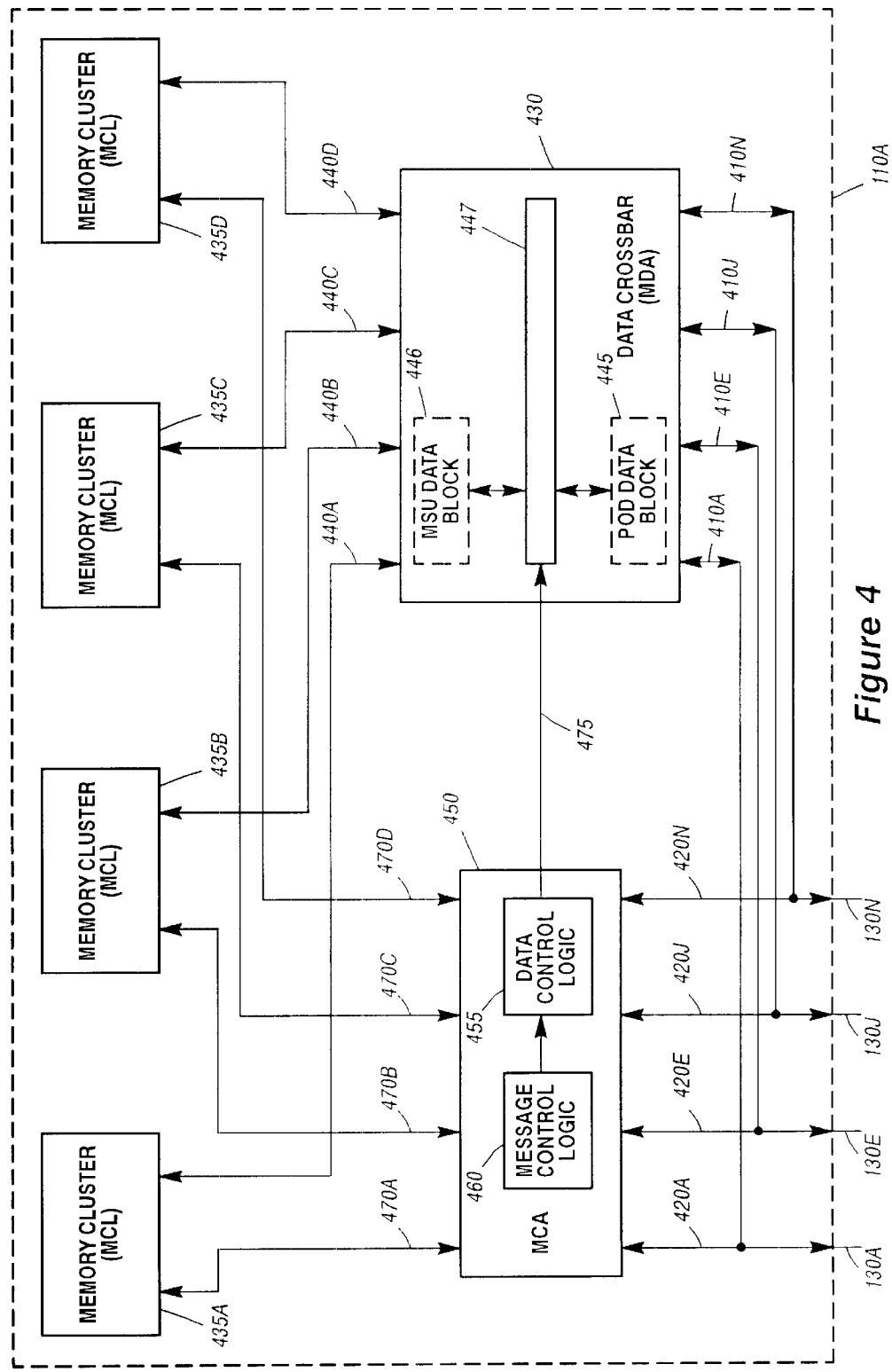
FIG. 4 is a block diagram of a Memory Storage Unit (MSU)

FIG. 4 is a block diagram of a Memory Storage Unit (MSU) 110. Although MSU 110A is shown and discussed, it is understood that this discussion applies equally to each of the MSUs 110. As discussed above, MSU 110A interfaces to each of the PODs 120A, 120B, 120C, and 120D across dedicated point-to-point MI Interfaces 130A, 130E, 130J, and 130N, respectively. Each MI Interface 130 is actually comprised of two separate, independently-operative, interfaces. The first interface transfers data signals, and includes bi-directional data bits, parity signals, and unidirectional control signals (not individually shown in FIG. 4). This first type of interface is represented by Data Interfaces 410A, 410E, 410J, and 410N. Each MI Interface 130 further includes a bidirectional Address/function Interface 420 (shown as 420A, 420E, 420J, and 420N), each of which includes address/function signals, uni-directional control signals, and a unidirectional address request (not individually shown in FIG. 4).

Data Interfaces 410A, 410E, 410J, and 410N are coupled to the Memory Data Crossbar (MDA) 430. The MDA 430 buffers data signals received on Data Interfaces 410 in POD Data Blocks 445. POD Data Block 445 is shown for Data Interface 410A, but other similar structures exist for each of the Data Interfaces. MDA 430 provides the switching mechanism that routes these buffered data signals to an addressed one of the storage units called Memory Clusters (MCLs) 435 (shown as 435A, 435B, 435C, and 435D). Data signals are provided to the MCLs via Bi-directional Interfaces 440 (shown as 440A, 440B, 440C, and 440D). MDA further includes storage structures call MSU Data Blocks to buffer data signals, if necessary, before the signals are transferred from the MDA to a MCL, or when data signals are received by the MDA from a MCL as occurs during a memory Fetch operation. Only the MSU Data Block 446 for Bi-directional Interface 440A is shown, but other similar structures existing for each of the Bi-directional Interfaces 440 shown in FIG. 4.

Each of the MCLs 435 stores data signals as well as the state signals that describe the stored data signals. That is, each MCL includes a portion of the main storage facility provided by the MSU, and also includes a corresponding portion of Directory Memory 160 of FIG. 1. When any memory operation is performed to data signals stored in a MCL, the corresponding state signals for those data signals are also modified in a manner to be discussed below. In addition to routing data signals between various ones of the PODs 120 and ones of the MCLs 435, the MDA 430 also routes buffered ones of the data signals received from any of the PODs to any other selectable one of the PODs during POD-to-POD transfer operations. A POD may even route buffered data signals back to itself, if desired. For example, data signals received from POD 120A and buffered by MDA 430 may be routed to Data Interface 410A, 410E, 410J, or 410N for reception by POD 120A, 120B, 120C, or 120D, respectively. These operations are referred to as "data by-pass operations". For conceptual reference, one may want to be able to do a POD-to-POD transfer operation if one POD (or a processor unit within it) wants a cache line which is owned by a different POD (or perhaps another processor within the POD). The Memory unit receiving the request would order the owning POD to return the cache line data. When the current owner POD returned the data, the Memory unit may preferably deliver the data to the requesting POD (new owner) using an accelerated bypass path that avoids a lengthy access to the main memory storage to write back and then read out the returned data. The switch of ownership to the requester POD in the ownership directory is done after the bypass operation Whereas the MDA 430 buffers data signals provided via Data Interfaces 410 and Bi-directional Interfaces 440, the Memory Controller (MCA) 450 buffers the address and control signals associated with POD-to-MSU requests that are provided via Address/function Interfaces 420. The address portion of the requests are buffered until the addressed one of the MCLs 435 is ready to receive these signals on Address Lines 470 (shown as 470A, 470B, 470C, and 470D). At this time, Data Control Logic 455 in the MCA 450 provides the address and control signals to the addressed one of the MCLs 435, and also provides Control Signals 475 to Data Queue Interconnect Logic 447. Control Signals 475 provide all the data routing control to logically connect a selected one of the POD Data Blocks to a selected one of the MSU Data Blocks, and to also initiate sequences to move the data from a MSU Data Block 446 to a MCL 435. For example, data can be transferred from POD Data Block 445 to MSU Data Block 446 in preparation to perform a memory write operations to MCL 435A. In the case of a fetch operation wherein data is retrieved from an addressed one of the MCLs, no data is initially provided with the request, and instead data is returned from the addressed MCL 435 at the conclusion of the request processing.

As discussed above, data may also be transferred from one POD Data Block to a second POD Data Block during POD-to-POD transfers which are controlled by Control Signals 475. These types of transfers are called data by-pass operations because the data is not written to memory before it is made available by the POD that most recently stored the data copy to a new requester. This allows data transfers to be performed more efficiently. Use of this by-pass path is controlled by Data Control Logic 455, which recognizes the instances in which data is being returned by one POD in response to a data request by the same or a different POD. Data Control Logic generates the necessary logic levels on Control Signals 475 to logically connect the appropriate interfaces of the POD Data Blocks to facilitate the transfer.

Another function performed by MCA 450 involves message routing capabilities. Message may be provided by an I/O Module 140 or a Sub-POD 210 to other I/O Modules and/or Sub-PODs in Platform 100. These messages (also called message commands) provide information on system occurrences to other units within the same partition as the sending unit. Routing information associated with a message is provided on the Address/function Interfaces 420 to the MCA. A corresponding data portion of each message is provided on Data Interfaces 410 to the MDA 430. In response, Message Control Logic 460 generates signals that, in turn, cause Data Control Logic to generate the appropriate logic levels on Control Signals 475. These signals logically connect a source POD Data Block with one or more other POD Data Blocks within MDA 430. The recipient POD Data Blocks then provides the message data signals to the one or more respective PODs so a TCM may forward the message data to the specified Sub-PODs and/or I/O Modules.

Directory-Based Data Coherency Scheme of the System Architecture in the Preferred Embodiment System Platform Before discussing the memory configuration of Platform 100 in more detail, the data coherency scheme of this system is discussed. Data coherency involves ensuring that each processor within Platform 100 operates on the latest copy of the data, wherein the term "data" in the context of the current Application refers to both processor instructions, and any other types of information such as operands stored within memory. Since multiple copies of the same data may exist within platform memory, including the copy in the MSU 110 and additional copies in various local cache memories (local copies), some scheme is needed to control which data copy is considered the "latest" copy.

As discussed above, the platform of the current invention uses a directory protocol to maintain data coherency. In a directory protocol, state information is associated with units of data stored within the main memory. In the preferred embodiment, state information is stored in Directory Memories 160A, 160B, 160C, and 160D of FIG. 1 for each 64-byte segment of data, or cache line, residing within the MSUs 110. For example, the state information describing a cache line of data stored in MSU 110A is stored in Directory Memory 160A, and so on. State information is monitored and updated by a controller when a copy of a cache line is requested by one of the Sub-PODs 210 so that the Directory Memories record which Sub-PODs 210 or I/O Modules 140 have copies of each cache line in the system. The state also includes information on the type of copies that reside within the system, as is discussed below.

In the present invention, a cache line copy may be one of several types. Copies residing within caches in the Sub-PODs may be either "shared" or "exclusive" copies. If a cache line is shared, one or more Sub-PODs may store a local copy of the cache line for read-only purposes. A Sub-POD having shared access to a cache line.may not update the cache line. Thus, for example, Sub-PODs 210A and 210B may have shared access to a cache line such that a copy of the cache line exists in the Third-Level Caches 310 of both Sub-PODs for read-only purposes.

A cache line may also exist in the exclusive state, which is also referred to as "exclusive ownership". Exclusive ownership may be granted to only one Sub-POD at a time for any given cache line. When a Sub-POD has exclusive ownership of a cache line, no other Sub-POD may have a copy of that cache line in any of its associated caches. A cache line is said to be "owned" by the Sub-POD that has gained the exclusive ownership of that cache line.

A Sub-POD is provided with a copy of a cache line after the Sub-POD makes a Fetch request on Sub-POD Interface 230A to the TCM 220. The TCM responds by providing a Fetch request to the appropriate MSU 110 based on the cache line address. The type of Fetch request made by the TCM to the MSU is determined by the type of cache line copy that is requested by the Sub-POD.

A. Fetch Copy Requests

When a Sub-POD requests a read-only copy of a cache line, the TCM responds by issuing a "Fetch Copy" command to the addressed one of MSUs 110A–110D on the command lines of the corresponding MSU Interface (MI) 130. At the same time, the cache line address is asserted on the MI address lines. The MSU receiving this request consults its Directory Memory 160 to determine the current state of the requested cache line. If the MSU stores the most recent copy of the cache line as indicated by a cache line state of "present", the MSU can provide the cache line data accompanied by a response indication directly to the requesting Sub-POD 210 via the TCM on MI 130. The response indication is encoded on unidirectional, MSU-to-TCM control lines included within each of the MIs 130.

The MSU may not have the most recent copy of the cache line because another Sub-POD is the exclusive owner of the data. In this instance, the MSU must request that this owner Sub-POD return any updated data to the MSU. To accomplish this, the MSU issues a "Return Function" to the owner Sub-POD via the associated TCM 210. The Return Function is encoded on the command lines of the MI 130, along with the address of the requested cache line, and is then received by the associated TCM and forwarded to the target Sub-POD.

Several types of Return Functions exist. In the current example, the requesting Sub-POD is requesting a read-only, shared copy of the cache line. This means that although the owner Sub-POD must provide any cache line updates to the MSU so these updates can be provided to the requesting Sub-POD, the owner Sub-POD may also keep a read-only copy of this cache line. To communicate this, the MSU issues a special Return Function called a "Return Keep Copy". The TCM responds by returning the requested cache line on the data lines of the MI 130, and by further asserting a "Return Command" on the MI command lines. If this Sub-POD retains a read-only copy of the cache line, that Sub-POD is no longer considered the "owner", since no write operations may be performed to the cache line. Thus, the Sub-POD is said to return both data and ownership to the MSU with the Return Command.

After data is returned from the Sub-POD, a data by-pass operation is employed to route the data from the returning MI 130 to the MI associated with the requesting unit. It may be noted that data is routed in this manner even if the previous owner did not modify the cache line. Providing unmodified returned data in this manner is more expedient then reading the cache line from the MSU. The returned data need only be written back to the MSU if the cache line was actually modified as is indicated by the type of Return Command issued by the Sub-POD. A Sub-POD issues a "Return Block" command to indicate the presence of a modified cache line, whereas a "Return Fast" command is issued to indicate the return of an unmodified cache line. In either instance, the MSU Directory Memory 160 is updated to reflect the new cache line state.

B. Fetch Original Requests

In a manner similar to that discussed above with regards to read-only cache line copies, a Sub-POD gains exclusive ownership of a cache line by making a "Fetch Original" Fetch request to the MSU via the TCM 220, which encodes the request on the command lines of the MI 130. In response, the MSU may provide the cache line directly if the cache line is "present" in the MSU such that no other Sub-POD has a copy of the cache line.

When a Sub-POD makes a request to gain exclusive ownership of a cache line, and the cache line is stored within another Sub-POD in the system, the request is handled in one of several ways. If another Sub-POD has exclusive ownership of the cache line, the MSU issues a Return Function to the owner Sub-POD requesting the return of the cache line data in the manner discussed above. In this instance, a "Return Purge" function is issued to indicate that the previous Sub-POD owner may not keep a copy of the cache line, but instead must purge it from all cache memories. This is necessary since only one Sub-POD may have exclusive ownership of a cache line at one time.

Upon receipt of the Return Purge function, the Sub-POD determines whether the cache line has been modified. If so, the Sub-POD returns both the data and ownership to the MSU by directing the corresponding TCM 220 to issue a Return Command on the MI 130. Alternatively, if the owner Sub-POD has not modified the cache line, the Sub-POD may return just the ownership to the MSU using a "Return Fast" command in the manner discussed above. In this instance, the owner Sub-POD may not keep a copy of the cache line for any purpose, and the cache line is marked as invalid in the local cache.

The MSU responds to the Return Commands by providing the most recent cache line data, along with exclusive ownership, to the requesting Sub-POD via the associated TCM. The MSU provides this response by encoding an acknowledgment on the command lines of the MI along with the data provided on the MI data lines. Additionally, the MSU updates the corresponding Directory Memory 160 with the cache line state to indicate the new Sub-POD owner, and stores any returned data.

The above description relates to the return of data when a requested cache line is exclusively owned by another Sub-POD. According to another scenario, the cache line may reside as a read-only, shared copy within a cache of one or more Sub-PODs. In this instance, the MSU issues a "Purge Function" to these Sub-PODs such that all local copies are invalidated and can no longer be used. The MSU then provides the cache line and ownership to the requesting Sub-POD and updates the Directory Memory state in the manner discussed above.

C. Flush Operations

In addition to returning cache line data to the MSU 110 following the receipt of a Return Function, Sub-PODs may also provide data to the MSU in other situations. For example, a Sub-POD may provide data to be written back to an MSU during Flush operations. When a Sub-POD receives a cache line from an MSU, and the cache line is to be copied to a cache that is already full, space must be allocated in the cache for the new data. Therefore, a predetermined algorithm is used to determine which older cache line(s) will be disposed of, or "aged out of", cache to provide the amount of space needed for the new information. If the older data has never been modified, it may be merely overwritten with the new data. However, if the older data has been modified, the cache line including this older data must be written back to the MSU 110 during a Flush Operation so that this latest copy of the data is preserved.

D. I/O Operations

As discussed above, cache lines residing within a Sub-POD will have either a "shared" or "exclusive" state. Other types of state indications are used when a cache line resides within a storage device of an I/O Module 140. For example, a state of "I/O copy" is used to describe a read-only copy of a cache line stored by an I/O Module. In a manner similar to that described above for shared cache lines, a cache line in the "I/O copy" state may not be modified. Unlike a cache line having a state of "shared", a cache line in the "I/O copy" state may only be stored by one I/O Module at a time. No other TLC or I/O Module may have a copy of any kind, shared or exclusive, while an I/O Module has a copy of a cache line. In preferred embodiments we do not currently use the I/O copy state.

I/O Modules 140 may also store exclusive copies of cache lines. Such cache lines are said to have a state set to "I/O exclusive". Both read and write operations may be performed to a cache line that is exclusively owned by an I/O Module. Unlike cache lines that are exclusively owned by a Sub-POD (that is, have a state of "exclusive"), a cache line that is exclusively owned by an I/O Module will be retained by that unit until it returns the data back to the MSU without prompting. The MSU will not initiate a Return operation when the cache line is in this state, and any requests for the cache line will remain pending until the I/O Module performs a Return operation.

Finally, as indicated above, a cache line may have a state of "present". This state is assigned to the cache line when the MSU has the most current copy of the data and no other Sub-PODs or I/O Modules have a valid local copy of the data. This could occur, for example, after a Sub-POD or I/O Module having an exclusive copy of the cache line performs a Flush or Return operation so that the MSU thereafter has the only valid copy of the data. This state indication is also assigned to a cache line after an I/O Module initially stores that cache line in the MSU during what is referred to as an "I/O Overwrite" operation. An I/O Overwrite is performed to initially load the MSU with data, and is also performed during recovery operations in a manner to be discussed below. An I/O Overwrite operation may be performed whether or not any other Sub-PODs or I/O Modules have local copies of the overwritten cache line. The MSU issues a Purge function to these Sub-PODs or I/O Modules so that the outdated data is invalidated.

E. Messages

Another type of command that may be issued by I/O Modules or Sub-PODs to the TCM is a message command. The issuance of this type of command is not dictated by coherency considerations, and is instead used to communicate the occurrence of certain types of events to units assigned to the same partition. Messages are routed from the TCM to the MSU 110 in a manner similar to the other commands discussed above. Data associated with these commands are transferred during a POD-to-POD by-pass operation from one MI Interface 130 to the same, or a different, MI Interface, as dictated by an address contained in the message. Only units assigned to the same partition as indicated by the message may receive and respond to the message. As discussed above, the partition to which a unit is assigned is indicated by a partition indicator stored in the Partition Register 270.

Fault Handling System and Method of Preferred Embodiment of the Invention

The current Platform 100 allows multiple partitions to be created, each running a different, independent instance of an Operating System (OS). The partitions are created by assigning I/O Modules and Sub-PODs to a corresponding partition using the partition register indicators, and by further enabling or disabling various interfaces within the TCMs and MSU. For example, Data Control Logic 455 of the MCA 450 may be programmed to disable data by-pass operations between PODs that are not associated with units in the same partition. An OS instance is loaded to control the operation of the various units assigned to the partition.

Each partition will be assigned various memory ranges within the MSU 110. These memory ranges store the various instructions and program data that will be visible to the OS and application programs executed by the processors of that partition. Any requests to memory made by the I/O Modules 140 or the IPs 350 will be directed to the partition's memory range using an address translation scheme provided by logic associated with each of the I/O Modules 140 or each of the Sub-PODs 210, respectively.

Some address ranges may be shared between partitions. The manner in which multiple partitions share memory to facilitate communication is described in detail in the application entitled "Computer System and Method for Operating Multiple Operating Systems in Different Partitions of the Computer System and for Allowing the Different Partitions to Communicate with One Another Through Shared Memory", which is referenced above. Because partitions are allowed to share memory ranges, it is important to provide a system fault recovery mechanism that isolates any faults that may occur to the failing partition. If the fault is allowed to cause corruption within any portion of the main memory shared by one or more other partitions, the other (non-failing) partitions could be stopped as well.

The current fault handling system and method isolates faults as closely as possible to the source of the failure, while allowing uncorrupted requests to complete normally. Memory that is shared between partitions is recovered so that any non-failing partition that shares a memory range with the failing partition may continue processing without interruption.

Figure 5:
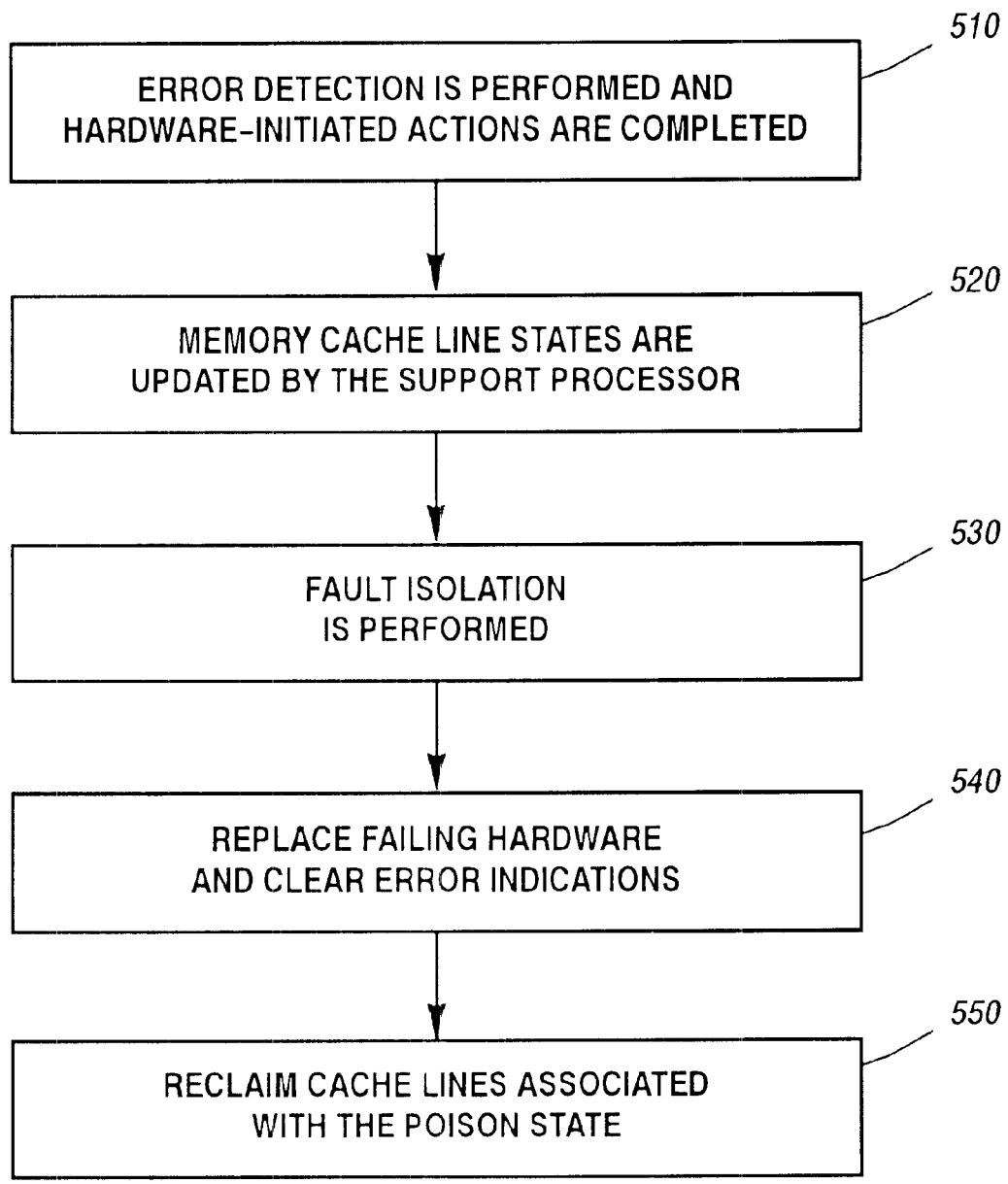
FIG. 5 is a flowchart of the stages utilized to perform fault recovery according to the current invention. Each of these stages will be discussed in detail below.

FIG. 5 is a flowchart of the stages utilized to perform fault recovery according to the current invention. Each of these stages will be discussed further below. According to Stage 510, error detection and hardware initiated actions are performed within the TCM 220 and the MSU 110. In Stage 520, the Support Processor 250 performs recovery actions to place all cache lines within the MSU 110 in a known state. Stage 530 is utilized to perform fault isolation. Stage 540 involves the installation and initialization of any new hardware that is necessary to replace the failing unit. Finally, in Stage 550, MSU address ranges affected by the fault are reclaimed, thus completing the recovery process.

There are many different systems known to those of skill in these arts for detecting errors. It is not necessary to detail these in order to provide an understanding of the invention herein. In this system it is therefore not necessary for a particular parity checking schema or built-in-self-test schema or similar device characteristics to exist, the invention assumes error checking is done, and the result is reported to or tallied in the error registers 280/241, as indicated in FIG. 2.

In the preferred embodiment, parity checks are done on each interface transfer at the POD level and the inventive fault handling system described in detail herein picks out the problem from all other possible faults on the POD. Each POD can have up to 4 errors and the whole POD can have a single error indicating the entire POD is considered unusable, as for example when the address translation hardware is bad. Thus in an error register 241 for a POD, in the preferred embodiment there are at least 5 bits indicating the fault status for the POD.

I. Error Recovery Actions for Stage 1

A. TCM-Initiated Error Recovery Actions

Figure 6:
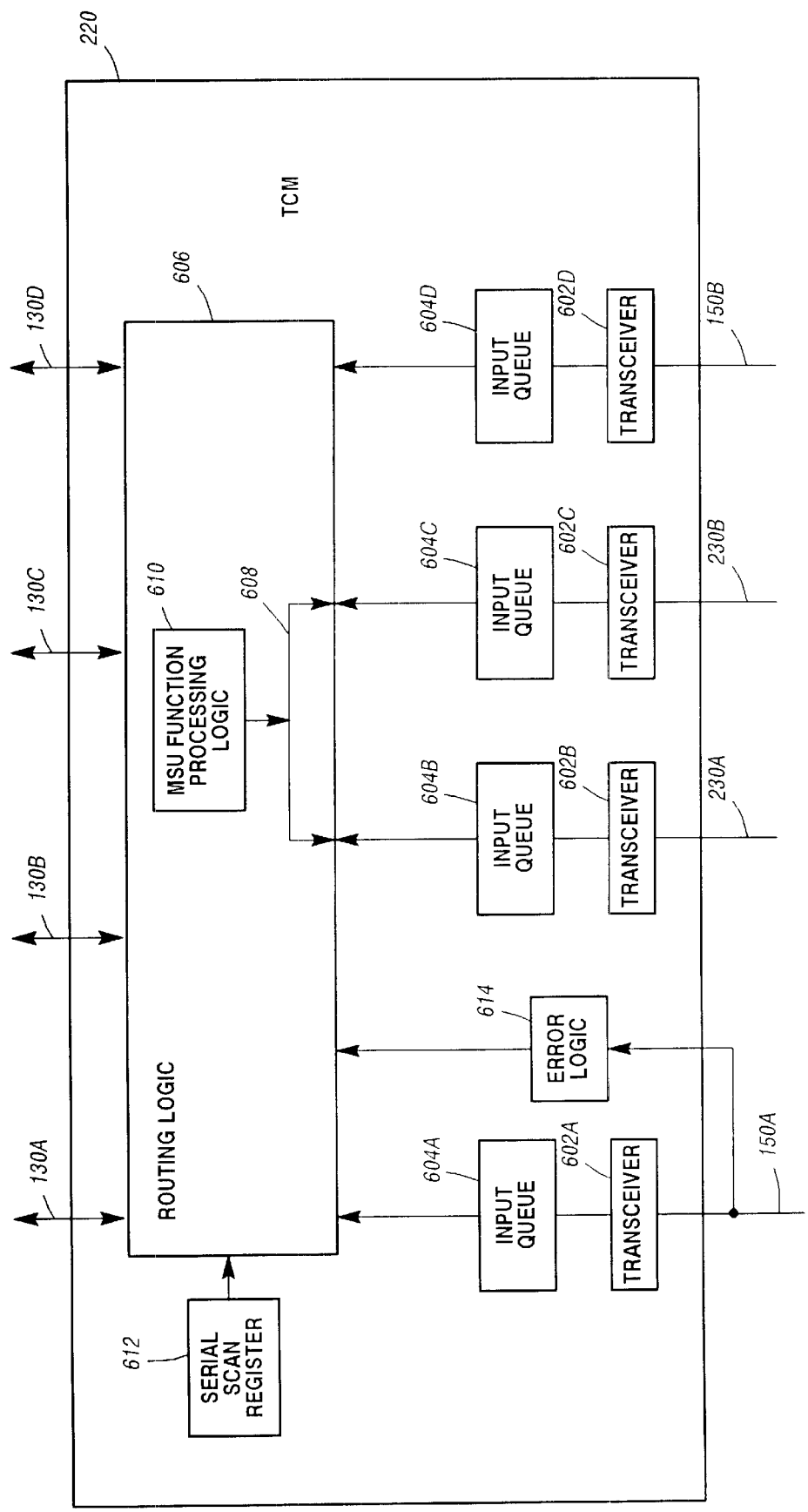
FIG. 6 is a block diagram of the TCM.

FIG. 6 is a block diagram of the TCM 220. In the preferred embodiment this is usually in the form of a single ASIC chip or a pair of chips with support components.

Requests are provided by the I/O Modules 140 (FIG. 1) on a respective one of the MIO Interfaces 150, whereas requests from Sub-PODs 210 are presented on a corresponding one of the Sub-POD Interfaces 230. These requests are forwarded via one of the enabled Transceivers 602 to a respective Input Queue 604. For example, a command provided by Sub-POD 210A is transferred on Sub-POD Interface 230A to Transceiver 602B, and is forwarded to Input Queue 604B.

Each of the MIO Interfaces 150, Sub-POD Interfaces 230, and MI Interfaces 130 is a split-transaction interface. According to this type of interface structure, a first portion of each of the interfaces is used to transfer request commands and addresses. Another portion of the interface operates independently from the first address portion to transfer any accompanying data signals. This means that for a given request, the request address and associated command are not necessarily transferred from the requesting unit at the same time the associated data is provided.

In the system of the preferred embodiment, the address and command portion of a request will always be received by the TCM via the MIO Interfaces 150 or the Sub-POD Interfaces 230 no later than any associated data signals. However, the data portion may be received much later than the address portion of the request. Once the two portions of the request have been received at the MSU, these portions are matched by using an ordering scheme. According to this scheme, data portions of the requests are sent in the same order as the corresponding address portions so that they may be matched within the MSU.

Split-transaction interface structures are utilized to increase the efficiency of the request transfers by allowing requests that do not include data signals to use the address/command portion (often thought of as simply the address portion) of the interface while another request completes the data transfer of a 64-byte cache line on the data portion of the interface.

During normal system operations, each Input Queue 604 stores requests from the respective unit. For requests associated with data, the data may not have been received at the time the address and command portions of the request are provided to Routing Logic 606. Irrespective of whether the data has been received, routing Logic 606 transfers the address portion of the request to the appropriate one of the MI Interfaces 130 based on the address. For example, a request associated with an address that maps to MSU 110A will be routed to MI 130A, and so on. As stated above, each of the MSUs 110A through 110D maps to one-fourth of the address space of the system.

When the data portion of the request is received from the requesting unit, Routing Logic 606 routes this portion of the request to the appropriate MI Interface. This routing can be accomplished because the Routing Logic 606 records the order that request addresses are received at each interface, and further records the MI Interface to which any request is routed. Since the system of the preferred embodiment imposes the restriction that a requesting unit must always provide data signals in the same request order in which the address signals are sent, Routing Logic can determine the Output Queue to which any subsequent data signals are to be provided. (For example, if a first and a second address/command is sent by a requesting unit, and each address/command is of a type that has an associated data transfer (store) the requesting unit must send the data corresponding to the first address/command transfer before it sends the data corresponding to the second address/command transfer. By following this structure, only simple logic is required to keep the data and its associated address/command together.) This data is eventually transferred on the corresponding MI Interface 130 to the addressed one of the MSUs 110.

When an error condition is detected within either an I/O Module 140 or a Sub-POD 210, an error register located in the failing unit is set to record the unit error. For example, Error Register 280 (FIG. 2) is shown for Sub-POD 210A, but similar error registers (not shown) are provided for all other units in Platform 100, including the TCMs, and the MSUs. Additionally, an error indication register within the TCM is set to indicate that the TCM is in fault recovery mode. These error indications may be read by Support Processor 250 via Scan Interface 260, and will be cleared by the Support Processor when system recovery has completed.

Alternative designs could poison all output buffer output from TCMs instead of separately indicating the error to the MSUs via some kind of data signal, but that is not preferred.

In addition to setting an error register, the occurrence of an error condition causes an error indication to be provided on the respective MIO Interface 150 or the Sub-POD Interface 230. This error indication is provided to error logic within the TCM that is associated with each of the interfaces. This logic is shown as Error Logic 614 for MIO Interface 150A, but similar logic is also provided to detect errors on all other Sub-POD or MIO Interfaces within the TCM. Error Logic 614 disables Transceiver 602A when error indication is asserted.

In addition to being responsive to error signals on the respective MIO or Sub-POD Interface, Error Logic also includes parity checking logic. This logic verifies the parity signals received on the address and data portions of a request for the respective interface. Error Logic 614 will disable Transceiver 602A upon detection of a parity error during either portion of a request transfer on Interface 150A, for example.

After an interface is disabled because an error is detected, subsequent requests received on the disabled interface are ignored by the TCM 220. Any requests stored in the respective Input Queue 604 are processed normally if both the address and data portions of the request have been received. That is, if address and command signals had already been transferred to the MSU, and the corresponding data signals were stored in the TCM at the time the error is detected, the data signals are transferred to the MSU and processed normally. Likewise, if both the address and data signals for a given request reside within the TCM at the time an error indication is asserted, the request is processed normally.

In some cases, the address and command portion of a request may be stored within the Input Queue when the interface is disabled. If the corresponding data portion of the request had either not been received, or was only partially received, by the TCM at the time the error occurred, the address/command portion of the request and any associated data signals are discarded. On the other hand, the address and command portion of the request may have been transferred by the TCM to the MSU prior to the disabling of the interface. If the associated data transmission had not been initiated at the time the interface is disabled, a pseudo data packet is created, and existing data error bits (normally used to indicate the ECC or parity integrity of the data) are set to indicate that the data content is unusable. This packet, which is associated with an error indication, is provided by Error Logic 614 to Routing Logic 606, which then forwards it to the appropriate one of the MI Interface for transfer to the MSU. The pseudo data packet is required to complete a store command matching -rule required by the preferred embodiment MSU, and the request is processed normally, with existing fault handling mechanisms to handle the data with the error condition. If the associated data transmission was partially completed at the time of error, then Error Logic 614 sets the data error bit for the remaining data transfers and the request processing continues normally, again using existing fault handling mechanisms specified for data w/error conditions.

When an error is detected, the TCM will provide a corresponding error indication to the MSU, after it has handled all appropriate valid requests in its input queue or has satisfied the above mentioned store type requests with data packets to assure continued processing. Once the TCM provides error indications to the MSU there will be no more requests issued to the MSU by the TCM, for the corresponding failing requester. If, for any reason, there are remaining requests for the failing requester that are still held by the TCM after the error indication is sent to the MSU, the TCM will discard them. This simplifies the operations for the MSU. There are several types of error indications the TCM can provide. As discussed in the foregoing paragraph, the TCM may provide a data error indication to signal that an associated data packet transmission was not completed when the error occurred, and the request must therefore be processed as failing. This data error indication is provided along with the pseudo data packet discussed above, and is only issued to the MSU addressed by the request. This type of error indication is not associated with poison line fault handling per se, it follows existing data fault handling processes which are not discussed in detail herein. Other types of error indications are issued to all MSUs. For example, when the TCM detects that an error has occurred on one or more of the I/O Modules 140 or Sub-PODs 210, the Routing Logic 606 generates a time-multiplexed serial error signal that indicates which of the unit(s) failed. The TCM will also generate a TCM error signal if an error in the TCM logic is detected. This type of error indicates that the entire POD interface (not just a single unit) must be recovered. The handling of these errors by the MSU is discussed below.

Next, the TCM may disable certain data paths associated with the failing unit(s). As shown in FIG. 6, Platform 100 includes high-speed data by-pass paths within each TCM 220 to allow data that is requested by a first unit to be returned directly from a second unit if the first and second units are associated with the same TCM. For example, the use of this high-speed by-pass path allows data exclusively held by Sub-POD 210A of FIG. 6 to be provided to Sub-POD 210B on By-Pass Path 608 after Sub-POD 210B makes a request for a cache line owned by Sub-POD 210A. The use of these by-pass paths is discussed in detail in the co-pending application entitled "Cache-Level Return Data By-Pass System for a Hierarchical Memory" referenced above.

FIG. 6 illustrates the logic that controls the by-pass paths for TCM 220. MSU Function Processing Logic 610 receives Return Functions from the MSU for routing to a specified one of the interfaces for processing. These Return Functions initiate the return of data from one of the Sub-PODs after a request is made for data owned exclusively by that Sub-POD. MSU Function Processing Logic 610 enables By-Pass Path 608 when the requesting unit and previous data owner are associated with the same POD 120. The returned data can then be routed directly from the previous owner to the new requester instead of being routed via the MSU. This increases efficiency. The data may also have to be written back to the MSU if it was updated so that the MSU retains the latest data copy.

When a unit error or TCM error is detected, the By-Pass Path 608 is disabled by Routing Logic 610. In addition, in those instances in which a data transmission was in progress on the By-Pass Path 608 when the error occurred, an error indication is provided to the requesting unit on the By-pass Path. This error indication notifies the non-failing interface that the requested cache line has potentially been corrupted. The requester stores a "poison" indicator in the cache tag of its Third-Level Cache 310 indicating that this requested cache line is unusable until further recovery actions occur. The requester may also perform recovery actions as a result of the error indication. The recovery actions are unique to the application that requested the faulty data.

When an error is detected, the TCM must also condition the affected MIO and/or Sub-POD Interfaces for error recovery. Each of the MIO Interfaces 150, the Sub-POD Interfaces 230, and MI Interfaces 130 includes a hold signal. This signal indicates that storage devices within the respective unit are full. For example, the hold signals associated with the MIO and Sub-POD Interfaces are asserted to cause the TCM to temporarily suspend sending requests such as Data Fetch Responses to the I/O Module or Sub-POD, respectively, until this signal is no longer asserted. When an error occurs, it is desirable to ignore the hold signals on the failing interface so that responses may continue to be issued to the failing unit even if the hold signal is "stuck" in the active state. It may also be desirable to allow the MSU to issue Purge functions to a failing IP 350 or I/O Module 140.

The foregoing paragraphs describe the recovery actions performed by the TCM after an error indication is detected at one of the unit interfaces. Additional error recovery actions must be performed by the MSU during Stage 1 recovery. In particular, the MSU should process all uncorrupted requests, discard corrupted requests, and update the memory directory to reflect the fact that some memory ranges may have unrecoverable errors. The following paragraphs outline the MSU recovery actions in detail.

B. Description of MCA Operations Generally

The MCA 450 (FIG. 4) controls many of the recovery actions performed within the MSU following fault detection. Before discussing these recovery actions in detail, a discussion is provided of the MCA logical structure and its operation for background purposes.

Figure 7:
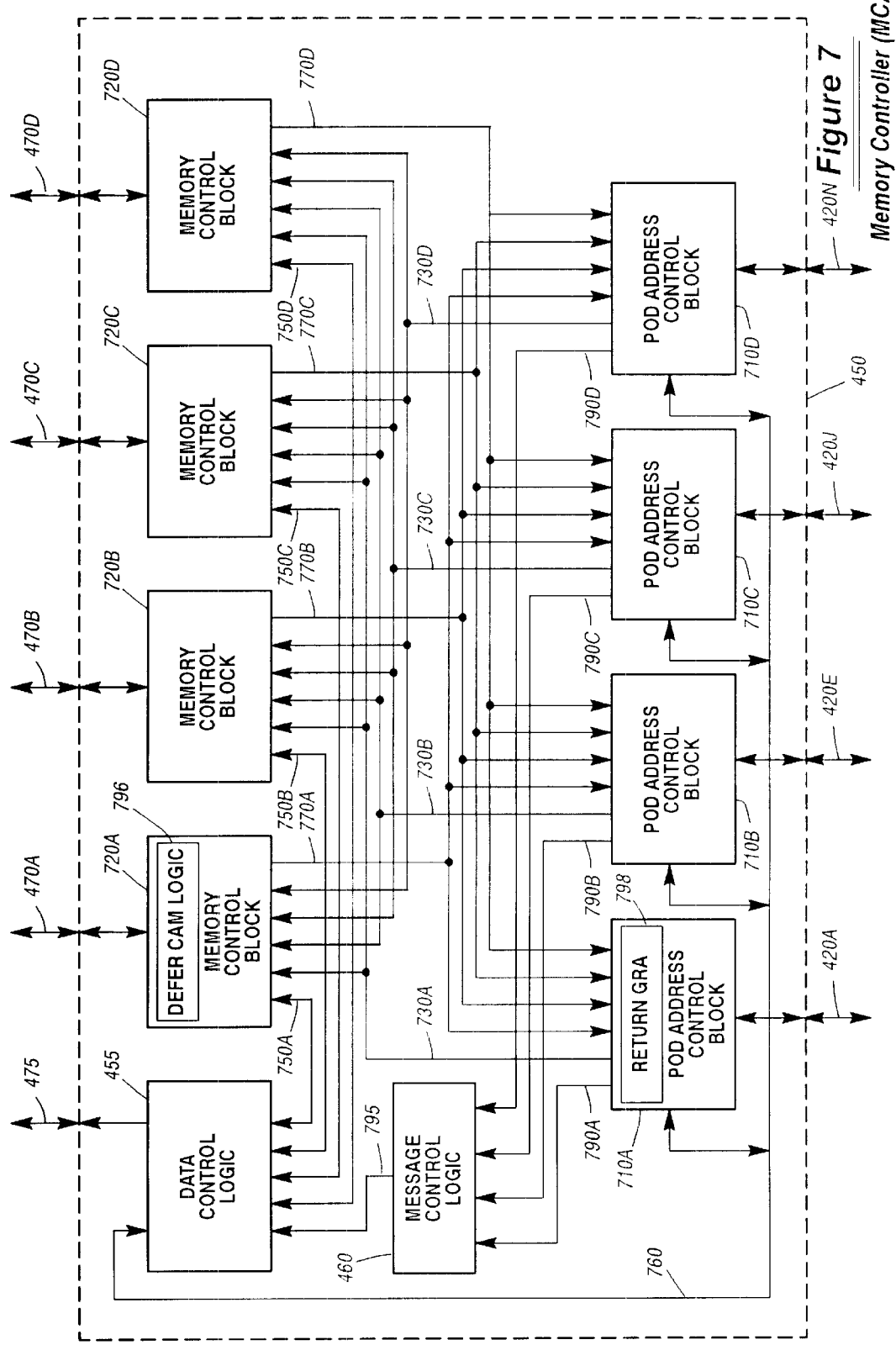
FIG. 7 is a block diagram of the Memory Controller (MCA)

FIG. 7 is a block diagram of the Memory Controller (MCA) 450. Although the following discussion specifically describes logic within MSU 110A, it is understood that this discussion applies equally to all MCAs included within all MSUs within Platform 100.

As discussed above, MCA 450 buffers the address and control signals associated with a memory request until the request may be routed to the addressed one of the MCLs 435. The address and control signals are received from a respective one of the PODs 120 on an associated one of the Address/command Lines 420, and are buffered in a respective one of the POD Address Control Blocks 710A, 710B, 710C, and 710D. For example, POD 120A provides an address and command over Address/command Lines 420A to POD Address Control Block 710A, and so on. The request information is stored in the respective one of the POD Address Control Blocks until it is selected as being associated with the next request to process.

Address and control request information will not be selected for processing from a POD Address Control Block until any pending data transfer for the request has been received by MDA 430. Recall that the split transaction MI Interface 130 allows the address to be transferred to the MCA 420 prior to an associated data transfer being provided to the MDA 430. When a data transfer is completed to the MDA 420, the data portion of a request may be matched to the corresponding address signals using Control Signals 475 in a manner largely beyond the scope of the current invention. When a match is detected, the request becomes eligible for processing.

When an address is selected as the next request address to process, it is provided to a selected one of the Memory Cluster Control Blocks 720A, 720B, 720C, and 720D via unidirectional address/control signals shown as Lines 730A, 730B, 730C, and 730D, respectively, based on the address associated with the request. In a fully populated MSU, each of the Memory Cluster Control Blocks handles one-fourth of the address range of the MSU. The selected Memory Cluster Control Block stores the request address and control signals until the request is selected for presentation to the associated MCL 435A, 435B, 435C, and 435D, respectively, across Address Lines 470A, 470B, 470C, and 470D, respectively.

When a Memory Cluster Control Block 720 selects an address for transfer to one of the MCLs 435, the Memory Cluster Control Block makes a request to Data Control Logic 455 on an associated one of the Request Lines 750A, 750B, 750C, and 750D. In response, Data Control Logic 455 provides the necessary control information on Control Lines 475 to the MDA to allow the MDA to provide any associated data to the MCL on Lines 440.

When the MCL is processing the request, directory state information for the cache line associated with the request is provided from the Directory Memory 160 within the MCL to the Memory Cluster Control Block. Logic within Memory Cluster Control Block updates the state information and stores this modified information back to the Directory Memory to reflect the new state of the cache line as it exists following the request.

If the request is associated with a Fetch operation and the MSU owns the requested cache line, data will be returned to the MSU Data Block 446 via Lines 440. The MCA controls the transfer of the cache line from the MSU Data Block 446 to the POD Data Block 445 associated with the requesting POD, and further controls the subsequent transfer of the cache line to the requesting POD. (The MSU will transmit a corresponding MSU Response signal vector to the POD to indicate that the operation relates to data).

As discussed above, a POD may also issue a Fetch command for a cache line that the MSU does not own. If the directory state information retrieved from the addressed MCL 435 indicates another POD has exclusive ownership of that data, the MCA controls initiation of a return operation. This results in the retrieval of the latest copy of the cache line from the POD 120 that owns the data. In these cases, the MCA transfers the address associated with the requested cache line from the Memory Cluster Control Block 720 to the appropriate one of the POD Address Control Blocks 710A, 710B, 710C or 710D, and then to the POD via the appropriate MI Interface 130 to initiate a return operation.

During the time the Return operation is pending to the previous owner, and before the previous owner returns data to the MSU, the directory state of the requested cache line is set to "deferred" to indicate that the pending return operation is in progress Additionally, the Fetch command and other request information is stored in a storage device called the Defer CAM that is included in Defer CAM Logic 796. (CAM is a known term that stands for Content Addressable Memory). Although only Defer CAM Logic 796 for Memory Cluster Control Block 720A is shown, each of the Memory Cluster Control Blocks includes similar logic. Lastly, an indication of the pending Return operation is entered into a storage device referred to as the Return GRA in the POD Address Control Block 710. Return GRA 798 is shown for POD Address Control Block 710, but similar structures (not shown) are included in each of the POD Address Control Blocks. (GRA is a term used by IBM that stands for Growable Register Array, which can be a multi-ported or other memory or register structure).

When the POD responds to the Return Function issued by the MSU, the Returned data will be provided to the requesting unit via one of the POD-to-POD data transfer operations discussed above. If the requester and previous cache line owner are associated with the same POD, this transfer operation could occur via a data path such as that shown as By-Pass Path 608 of FIG. 6. Otherwise, a high-speed by-pass path within the MSU is utilized to return the data. The corresponding return entry is then removed from the Return GRA 798. The returned data will also be written to the addressed one of the MCLs 435 and the directory state information for the cache line will be updated in this MCL to reflect that a different unit now owns the cache line. Following completion of these operations, the associated request entry will be removed from the Defer CAM Logic 796.

If a subsequent request is made for a cache line while an entry associated with that same cache line is stored in the Defer CAM Logic, an entry is made within the Defer CAM Logic for the subsequent request. This new request is associated with the previous deferred request for the same cache line. In the preferred embodiment, this association is accomplished using link pointers to create a linked list of requests waiting for the same cache line in a manner to be discussed below. When the first deferred request is finally removed from the Defer CAM Logic, the subsequent request may be presented to the addressed MCL for processing.

C. MSU-Initiated Error Recovery Actions for Serial Error Processing

With the above operation of the MCA set forth for background material, a description is next provided concerning the fault recovery steps taken by the MSU, and in particular, the MCA 450, when the MSU receives a serial error indication from the TCM. As discussed above, a serial error signal is used to transmit encoded, serial transmissions provided by Routing Logic 606 to the MSU to indicate whether one or more of the I/O Modules 140 or Sub-PODs 210 failed. When an MSU receives this error signal, it is transmitted to all sections of the MCA 450, including the logic sections shown in FIG. 7. Additionally, the MSU records the error state in a scan-set register (not shown) that will be cleared via scan-set by the Support Processor 250 upon recovery completion.

From the above discussion it is apparent that the serial error indicator may indicate one or more failing units, for example, a failing Sub-POD 210A and a failing I/O Module. When one or more of the units are indicating as failing by the serial error indicator, the MSU will perform predetermined steps that will place the MSU logic in a known state so that the other (non-failing) units associated with the interface can continue operating. For example, an operational Sub-POD 210 that is associated with the same TCM 220 as a failing I/O Module 140 can continue to operate normally, unless an error is detected that affects the entire TCM or TCM-to-MSU interface. The following paragraphs describe the steps taken by the MSU following the indication of a failing unit by the serial error indicator. These steps are taken for each of the failing units indicated by this error indicator. This discussion assumes that the TCM and TCM-to-MSU interface is operational.

Upon receiving an indication of a failing unit on the serial error line, the MSU initiates special sequencing to schedule the error indications to all MCA logic sections. Because of the previous rule that states the TCM, after it transmitted the serial error indication to the MSU, will not send further requests corresponding to a failed requester the MSU can treat all requests it currently contains as normal. The POD Address Control Block temporarily suspends its input interface, to inhibit operational request activity, and then waits until all store and store-return requests have been released using normal sequencing. This step ensures that POD-to-POD returns are allowed to finish as normal, and avoid boundary cases where fault handling logic would start too soon and cause an erroneous second MSU Response plus data transmission to the destination POD (remember that all commands received before the error condition is received are by definition good, trustworthy commands).

The POD Address Control Block will then temporarily suspend normal request releases from its input queue logic, in order to communicate the appropriate requester error conditions to each of the Memory Cluster Control Blocks 720 via normal control signals, which are included in Lines 730. The error conditions are communicated as special command types, and are queued into each of the Memory Cluster Control Block expansion queues 804, 806, 808, and 810. The error indication is also latched in Error Register 832 within each Memory Cluster Control Block. Specific handling of requests by the Memory Cluster Control Block are discussed later in the section entitled 'Poison Control Logic'. Also, during this time, the POD Address Control Block signals to its associated Return GRA 798 to discard any pending return operations directed to failing units, and to inhibit storing of any future return operations directed to a failed requester.

Previous messages commands, from a now-failed requester, currently in progress, are allowed to continue as per normal sequencing. Currently queued message commands from the failed requester are discarded. However, all message-acknowledge responses, delivered by the MSU to the source TCM when the MSU delivers the message to a destination TCM, are allowed to continue. This is done to maintain availability of the message communications path, between TCM and MSU, for operational requesters in the source TCM.

Finally, the POD Address Control Block will resume normal operations. It will remove the suspension on input queue request releases and resume the reception of new input commands.

D. MSU-Initiated Error Recovery Actions for TCM Error Processing

The above discussion describes those actions taken by the MSU after the serial error indicator reports a fault associated with a particular Sub-POD or I/O Module. According to this scenario, all requests from operational (non-failing) units are processed normally. Only requests from a failing unit are handled according to the foregoing error-handling process. Thus, a POD interface may be associated with one or more failing units, but may still remain operational for one or more other units.

In other instances, an entire POD interface may fail. This type of "TCM error" discussed above may occur when parity errors are detected on the MI 130, or when an uncorrectable error occurs within the TCM logic. In this case, the entire MI Interface 130 is considered unusable and is disabled. All requests associated with the interface are discarded in the manner discussed in the following paragraphs. Additionally, all logic in the affected POD Address Control Block 710 (FIG. 7) is cleared to a predetermined initialization state. This places the interface in a state wherein it is available for immediate use after the failure is corrected, either by replacing failing hardware, or by some other fault recovery procedure.

Following the assertion of a TCM failure, the affected POD Address Control Block asserts a signal on the respective MI 130 to signal that the failing POD is to stop issuing requests. Then, the interface between the POD Address Control Block and the failing MI Interface 130 is disabled to prohibit the POD Address Control Block from sending or receiving signals from the MI 130. Next, several logic sequences are invoked to clear various storage devices within the control logic to a predetermined initialization state.

Any POD-to-POD data transfer operations that are occurring at the time the failure is received are allowed to complete. In these situations, a complete cache line of data is resident within the MSU at the time the error is received, and a data transmission to a destination POD via the high-speed by-pass path discussed above has been initiated. Suspending the operation in a controlled manner is not possible, and the operation is therefore allowed to complete normally.

At the same time any in-progress POD-to-POD data transfer is completing, any in-progress transfer related to Store or Fetch requests that are being provided from the affected POD Address Control Block 710 to an addressed one of the Memory Cluster Control Block 720 is allowed to complete normally. Such requests involve data and control signals that were received by the MSU prior to the assertion of the TCM error signal, and will be processed by the MSU normally.

If the failure occurs during a command that has associated data the entire command is discarded immediately. If the command with data has been previously received the command will wait in the POD Address Control Block input queue until data reception, as per design. The TCM error condition will prevent the POD Address Control Block from recognizing current or future data reception conditions, and therefore the held command will be stuck until an associated data indication is made available. The fault sequencing logic will force the POD Address Control Block to create artificial data packets for each held command in this class. This will enable the command to be released from the input queue using normal sequencing. However, it will be discarded as described below because it originated from a failed POD.

Previous messages commands, from a now-failed TCM, currently in progress, are allowed to continue as per normal sequencing. Currently queued message commands from the failed TCM are discarded. However, all message-acknowledge responses, delivered by the MSU to the source TCM when the MSU delivers the message to a destination TCM, are allowed to continue. This is done to maintain availability of the message communications path within the MSU, in preparation for installation of replacement TCM hardware.

When all in-progress transfers between the Memory Cluster Control Blocks and POD Address Control Blocks have been completed, all transfers from the POD Address Control Block are discontinued. A special "discard mode" is entered in which requests that are stored within the POD Address Control Block involving data signals stored within the MDA 430 are discarded. This includes Return, Flush, and I/O Overwrite commands. During this discard mode, the POD Address Control Block provides control signals to Data Control Logic 455 to indicate that data associated with the request is to be discarded. In turn, Data Control Logic 455 generates the Control Signals 475 to cause the corresponding POD Data Block 445 of MDA 430 to discard the data signals. At the same time, the associated address and control signals stored in the POD Address Control Block are discarded. The sequence used to discard request signals places the logic associated with the discarded requests into a predetermined initialization state so that the logic is ready to receive requests when the MI 130 is again enabled following correction of the failure.

When all requests that are associated with data have been discarded, the TCM error indication is provided to all of the Memory Cluster Control Blocks 720. The manner in which this is done was described earlier in the serial error handling sequencing. Also, during this time, the POD Address Control Block signals to its associated Return GRA 798 to discard any pending return operations directed to failing units, and to inhibit storing of any future return operations directed to a failed requester. Finally any remaining requests within the POD Address Control Block are discarded.

Specific handling of requests by the Memory Cluster Control Block are discussed later in the section entitled 'Poison Control Logic'.

F. Poison Control Logic

The foregoing paragraphs discuss the recovery actions performed during Stage 1 510 of the fault recovery process (FIG. 5). Before continuing on with a discussion on Stages 2 through 5, a more detailed discussion is provided on the manner in which a cache line is set to the poison state.

Figure 8:
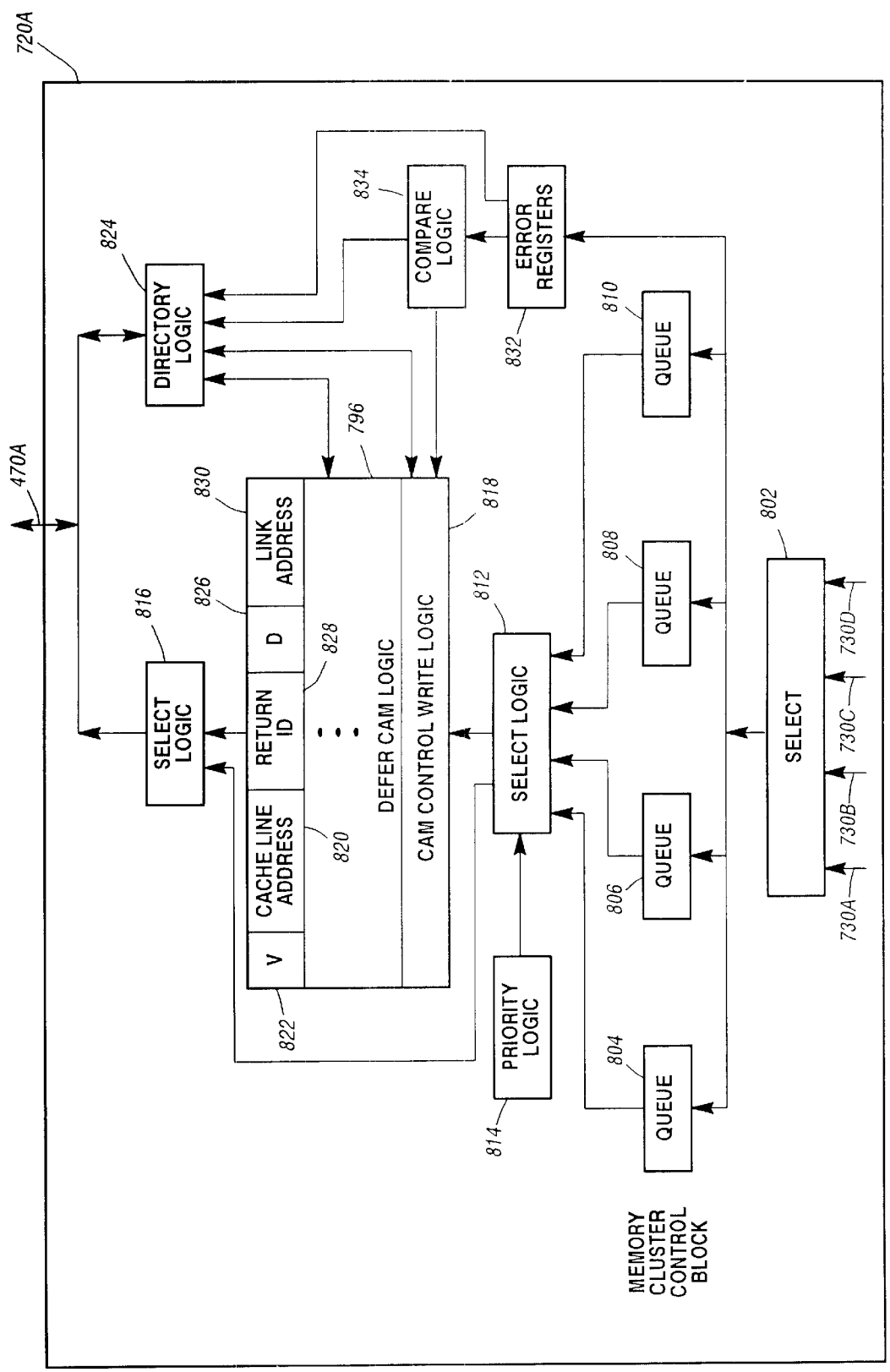
FIG. 8 is a block diagram illustrating the logic of a Memory Cluster Control Block in more detail, including the Defer CAM Logic and Directory Logic used to set a cache line to the poison state in accord with preferred embodiments of the invention.

FIG. 8 is a block diagram illustrating the preferred embodiment logic of a Memory Cluster Control Block 720A in more detail, including the Defer CAM Logic 796 used to set a cache line to the poison state in the Directory. Memory Cluster Control Block 720A is shown and described, but it will be understood that the other Memory Cluster Control Blocks of FIG. 7 include similar logic. Memory Cluster Control Block 720A receives memory requests from the POD Address Control Blocks 710 on Lines 730 in the manner discussed above. In the preferred embodiment, these requests are routed by Select Logic 802 to one of Queues 804, 806, 808 and 810 depending on the request address. Each of the MCLs 435 (Memory Clusters) includes four banks of memory ("0"–"3", not shown), and each of these banks including one quarter of the memory range of the MCL. Each of these four banks is respectively associated with one of Queues 804 through 810. Thus a request targeted for bank 0 within the MCL will be placed in the respective Queue 804, and so on. In a manner largely beyond the scope of this invention, requests are selected from Queues 804 through 810 for presentation to the MCL via Address Lines 470A according to an algorithm that optimizes utilization of this address interface. The algorithm is based, in part, on the memory bank that maps to the request address. The selection of the addresses is performed by Select Logic 812 according to this optimization algorithm implemented by Priority Logic 814.

During normal system operations, requests are routed via Select Logic 812 to Select Logic 816 and presented to Address Lines 470A for processing by MCL 435A. In some cases, a request is also entered into the Defer CAM Logic 796. For example, all Fetch requests are presented to Defer CAM Logic 796 at the same time they are also presented to Select Logic 816. These requests are entered into Defer CAM Logic 796 by CAM Control Write Logic 818. Each entry includes a Cache Line Address Field 820, which is the cache line address being requested by the Fetch request. An entry is recorded as being valid by setting the valid indicator ("V") shown as Field 822. The other fields in the entry are discussed below.

When a Fetch request is presented to the MCL, Directory Logic 824 receives the cache line status from Directory Memory 160 indicating the ownership of the cache line. If the requested cache line is owned by another Sub-POD or I/O Module instead of being present in the MSU, Directory Logic 824 causes the associated Fetch entry in Defer CAM Logic to be "deferred" by setting the deferred indicator ("D") shown as Field 826. Additionally, this entry is modified to indicate in the Return ID Field 828 which one of the requesters owns the requested cache line. For example, if Sub-POD 210A of POD 120A owns the requested cache line, an identity indicator for this Sub-POD is recorded in Field 828 of the associated Fetch request entry in Defer CAM Logic 796. The Directory logic initiates a Return function to the current owner, if the owner is a Sub-POD. A cache line owned by an I/O module will be automatically returned, without intervention by the MSU. In any event, the MSU will wait for the corresponding Return Command from the POD.

Eventually, the Return operation that was initiated as a result of the Fetch request results in the unless already done via the internal POD bypass path, The MSU will provide the returned data to the requester, unless already done via the internal POD bypass path, via the MSU high-speed POD-to-POD interface discussed above, and will also write updated data back to the addressed MCL. Updated cache line status will be written to the Directory Memory 160. When the operation is completed, the associated entry in the Defer CAM Logic 796 will be removed.

While a cache line is deferred in the manner discussed above, other requests for the same cache line may be received by the MSU. When this occurs, these other requests are also deferred by making an entry for the request in the Defer CAM Logic 796. The requests are marked as deferred by setting the "D" Field 826, and are associated with any previously-received entries for that cache line via the Link Address Field 830. The Link Address Field is used to implement a linked list of time-ordered requests for a same particular cache line. When a request is removed from Defer CAM Logic 796 in the manner discussed above, the next request in the linked list becomes eligible for processing by clearing the deferred indicator in the "D" field 826. This allows the request to be selected by Select Logic 816 and presented to the MCL for processing. The operation of the Defer CAM Logic is described in more detail in the co-pending Application entitled "System for Reducing the Number of Requests Presented to a Main Memory in a Memory Storage System Employing a Directory-Based Cache Scheme" described above.

As discussed above, after a serial or TCM error occurs, the entries in Defer CAM Logic 796 may undergo special processing, if the entries represent requests from failed requesters or represent requests from operational requesters for cache lines currently owned by now-failed requesters. This processing is initiated when an error indication is provided via one of the POD Address Control Blocks 710 (FIG. 7) to the Memory Cluster Control Blocks 720 via control signals which are included in Lines 730. This is done by using a special command, internal to the MSU, that is called 'Return Error'. A 'Return Error' command includes encoded requester identification, which indicates the particular requester that has failed. The error indications are made available to the Memory Cluster Control Blocks at specific times, as discussed earlier. The error indication is latched in Error Register 832 (FIG. 8), which in the preferred embodiment is a storage device storing an error signal associated with each Sub-POD 210 and each I/O Module 140 in Platform 100. One or more of these error signals may be set at once to indicate the occurrence of multiple errors. If a TCM error is received, the error indications in the Error Register 832 reflect a failure with every unit associated with the failing TCM.

When an error indication is received by the Memory Cluster Control Block, it loads the 'Return Error' command into each of its expansion queues 804 through 810. This acts as an error marker for queued flushes and returns. All of the flushes/returns within the Queues that were received prior to the receipt of the error marker are processed in a normal manner. The TCM logic, in cooperation with the MSU POD Address Control Block ensure that no more flushes and returns will be delivered to the Memory Cluster Control Logic, after the Memory Cluster Control Block receives the error indication.

Next, Compare Logic 834 compares each of the entries in Defer CAM Logic 796 against the signals stored in Error Register 832. The Compare Logic provides signals to Directory Logic 824 to indicate which, if any, of the deferred entries stored in Defer CAM Logic are associated with a cache line owned by a failing unit. The Directory Logic 824 causes a write operation to Directory Memory 160 which in turn will set the cache line state to poison for these cache lines. The associated Defer CAM Logic entries are then marked to "undeterred" by clearing Field 826. Once these requests are no longer deferred, they may be selected via Select Logic 816 for processing by the MCL 435, which results in the poison indication being returned to the original requester, as discussed above. In the preferred embodiment this indication to the original requester is included within the MSU Response signal group (part of interface 130A, 130E, 130J, and 130N) that was described earlier. The cache line data itself is also transmitted, even though the data includes no useful information.

Additionally, Compare Logic 834 also causes any entries associated with Fetch requests from a failing unit to be removed from the Defer CAM Logic if the requests have not yet resulted in the initiation of a return operation (that is, they are not yet deferred.) If a request of this type has already resulted in the initiation of a return operation to an operational requester, the operation is allowed to complete such that the cache line is returned to memory. However, the data is not provided to the failing requester.

Directory Logic 824 also has access to the contents of Error Register 832 for use during all subsequent memory request processing after the occurrence of the error. The operational requesters continue to make requests for memory data to the MCLs 435. If any request is made for a cache line that is owned by one of the failing units, Directory Logic will initiate the write of the requested cache line state to poison within the Directory Memory 160, and will allow the Fetch to complete by returning the poison indication to the requester. Fetch and I/O Return operations from failing units are discarded. Queued I/O Overwrite commands received from failing units are processed normally (they will be poisoned when another operational requester asks for the cache line).

During the recovery process, new requests from operational requesters are allowed to continue. These new requests will be processed normally if the cache line is not owned by a failed requester. If the new requests are associated with cache lines owned by a failed requester, then the poison line fault handling sequence is followed. That is, the cache line state is set to "poison", and the poison error indication is delivered to the operational requester. It may be noted that the requested cache line may have already been poisoned during prior recovery processing.

H. Error Recovery Actions for Stages 2 Through 5

Turning now to a discussion of the remaining stages of error recovery, during Stage 2 520 (FIG. 5), additional processing is performed by Support Processor 250. Support Processor is notified following the assertion of either the serial error or TCM error signals. It will be recalled that Support Processor 250 includes local memory that is loaded with system configuration information used to set up the partitions during system initialization using Scan Interface 260. Support Processor utilizes this configuration information to determine if any memory range exists within the MSU 110 that is shared between a partition that includes a failing unit or POD, and another partition that is still operational. If one or more such memory ranges exist, additional processing must be performed to recover the memory data.

The Support Processor has access via Scan Interface 260 to Serial Scan Registers 612 (FIG. 6) in any of the TCMs. Support Processor stores a special "Fetch MSU Ownership" (FMO) command and an associated cache line address in this Serial Scan Register. This data is then provided by the Serial Scan Register to Routing Logic 606 to be driven onto the Address/command Lines 420 of the associated MI Interface 130. This command is similar to other commands issued by the TCM to the MSU, and will cause the MSU to initiate a Return Function to obtain ownership of the addressed cache line. That is, the command will force the addressed cache line to eventually enter the "present" state.

During recovery of a failing memory range, Support Processor utilizes any one of the operational TCMs within Platform 100 to inject multiple FMO commands onto the associated MI Interface. An FMO command will be injected for each cache line in the associated address range(s) being recovered. In response to this command, the MSU reads the directory state of the addressed cache line and determines which action to take. If the cache line state is already set to "present", no processing is necessary. If the addressed cache line has a state of "shared" or "I/O copy", the MSU issues a Purge Function to all-operational Sub-PODs 210 or the appropriate I/O Module 140, respectively, that retains a copy of the addressed cache line. The MSU then updates its own copy of the cache line to a "present" state. If the directory state is "exclusive", the MSU issues a Return Function to cause any operational Sub-POD unit to return ownership and data so that the cache line state may be set to "present". If an I/O unit has an exclusive copy of the cache line such that the state is set to "I/O exclusive", the MSU waits for the I/O unit retaining the cache line to return the data without prompting. At that time, the cache line state will be written to "present". If the cache line is exclusively owned by a failing unit as can be determined by Directory Logic 824 (FIG. 8) utilizing the error indicators stored in Error Register 832, no Return Function is issued. The cache line state is set to "poison".

A cache line may have a state of "error-state". This probably means that the line has already been marked as poison in stage 1 processing, or has been recently been marked to poison because of continuing operational request traffic. The cache line is left in this state. (Other internal MSU and/or system faults could also cause the error state, but those causes would have been fatal and stopped the system by this time.)

Finally, a cache line may have a state of "deferred". As discussed above, this cache line state indicates that some type of action is currently pending related to the cache line. The FMO command will be linked into the Deferred CAM linked list as normal. When the pending action for which the cache line was marked "deferred" is completed, the state will resolve to "present", "shared", "exclusive", or "error-state"; and processing continues normally for each request in the linked list. The final state after completion of the FMO command will resolve to "present" or "error-state (poison)".

Figure 12:
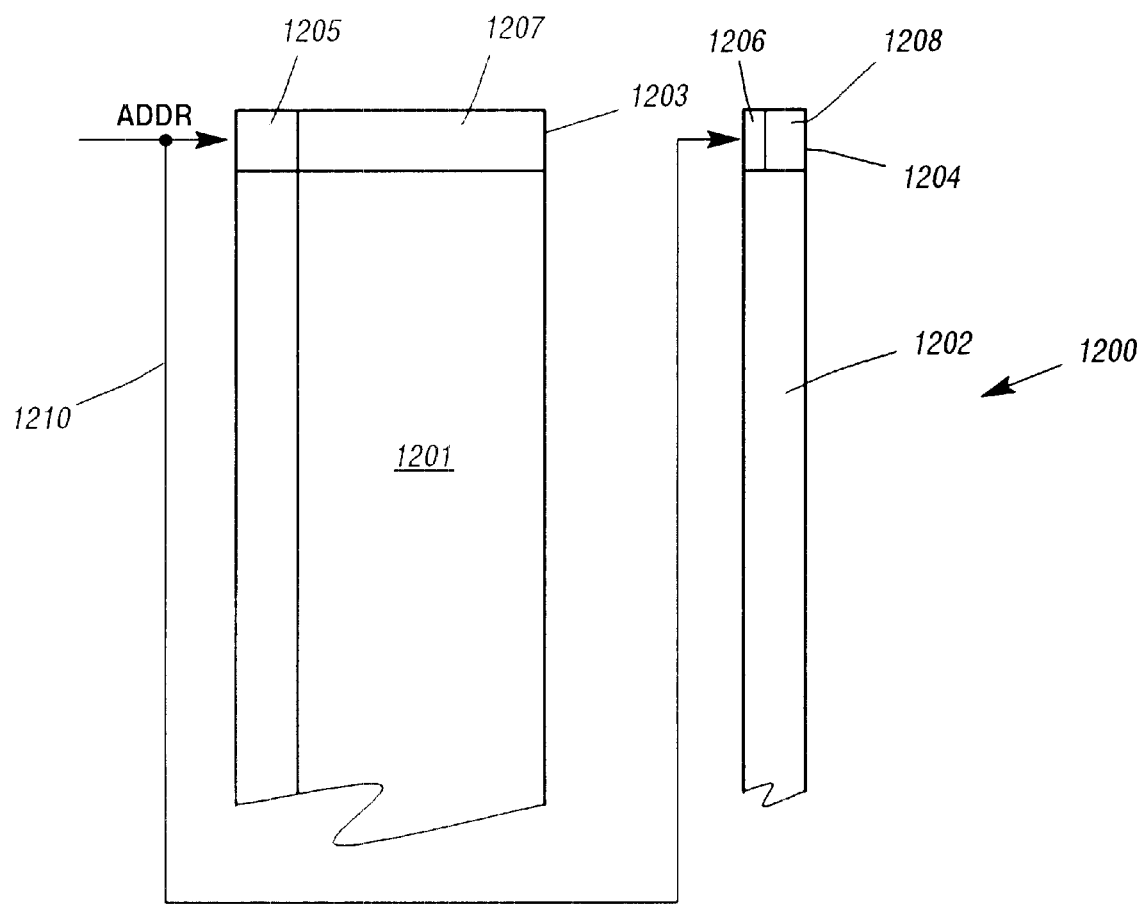
FIG. 12 is a block diagram of a directory employed to track cache line status and ownership in preferred embodiments.

(FIG. 12 illustrates a preferred form 1200 of memory directory structure 1202 and memory 1201 in a simplified logical format. Although it is clearly within the designers discretion to organize memory structures in ways different from that illustrated here as may be convenient to their computer systems organization, the preferred embodiment system has a single address line 1210 pointing to correspondent addresses 1203 and 1204 in the main memory 1201 and in the directory, respectively. Thus, in the location or cache line 1203, in the preferred embodiment is a small section of error correcting code information 1205 and the 64 byte cache line 1207. In the corresponding address in the directory memory for the cache line 1207, is a small error correcting code section 1206 and a data section of 9 bits 1204 which indicates the ownership type and status of the owner for the corresponding cache line data in 1207. Certainly other data could be included at the whim of the designer of a system referencing the inventive one described if desired, but this design is preferred as appropriately compendious considering the overhead of memory for this directory structure to be high at approximately a 1:40 ratio of directory storage area to available cache line storage.

Following processing of the selected MSU memory ranges in the manner discussed above, Stage 3 processing is performed. During Stage 3 processing, Support Processor 260 performs a dynamic scan read operation via Scan Interface 260 of the various error registers (such as Error Register 280 of FIG. 2) that are located in the Sub-PODs 210, the I/O Modules 140, the TCMs 220, and the MSUs 110. Support Processor analyzes the reported faults and determines which units and/or interfaces within Platform 100 are likely failing.

Using the fault analysis information obtained in Stage 3, Stage 4 540 processing is initiated. This involves installing new hardware for the failing units. The error conditions are then cleared using a dynamic scan of the error registers such as Error Register 280 via Scan Interface 260, and the replacement units are scanned to an initialization state.

Finally, Stage 5 550 is executed. During this stage, all cache lines that are marked to the "poison" state must be written with uncorrupted data, and the associated cache line state should be set to "present". To accomplish this, Support Processor reads Directory Memory 160 via Scan Interface 260 to determine which cache lines have been set to the poison state. (Recall that Scan Interface is coupled to every MSU in the system in a manner described above.) Support Processor utilizes Scan Interface 260 to provide this information to the I/O Module 140 that is performing the recovery actions. The I/O Module then performs I/O Overwrite operations to clear these cache lines to an initialization state and set the cache line state to "present". These memory locations are thereby made available for use when the failure has been corrected.

Figure 9:
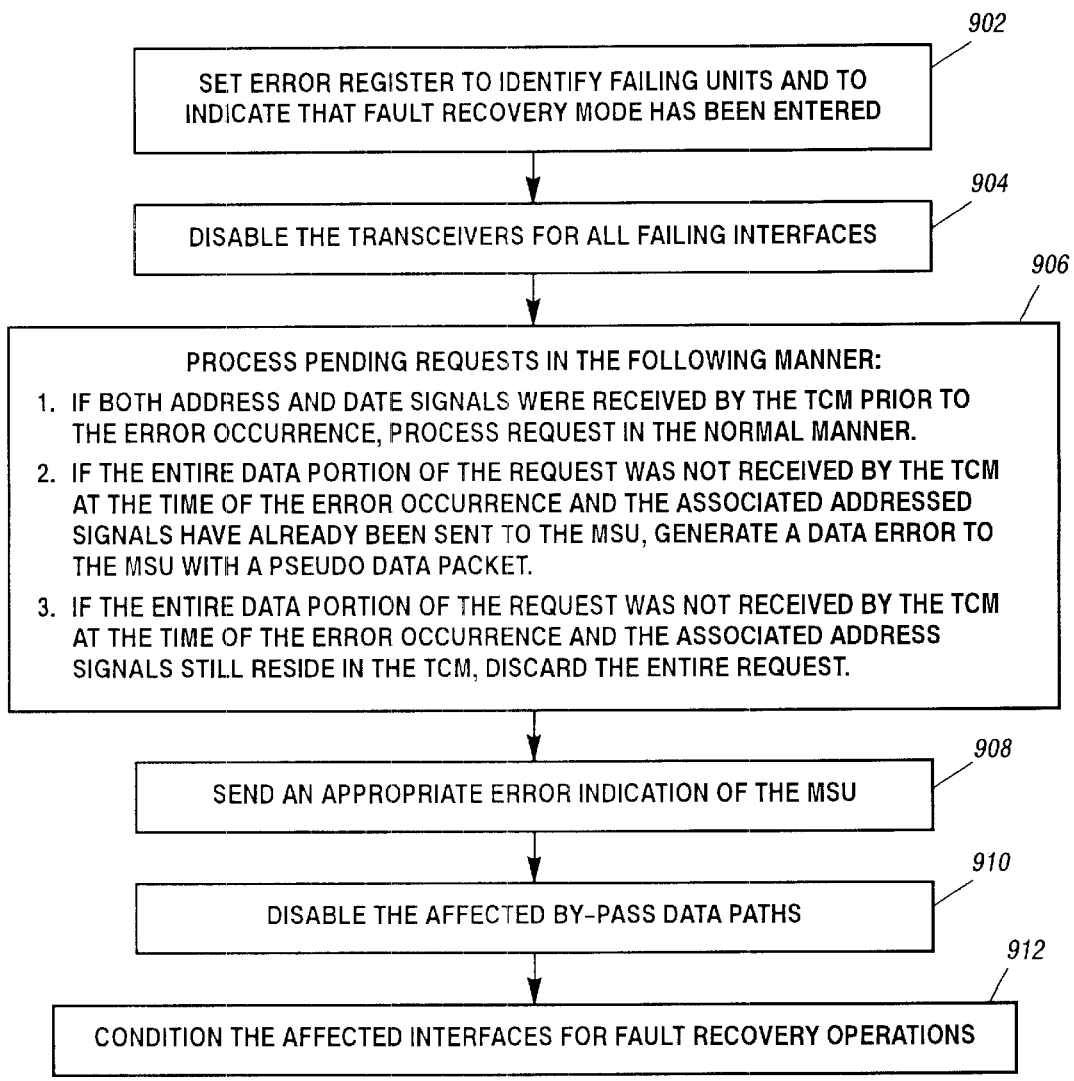
FIG. 9 is a flowchart illustrating the steps performed by the TCM during error recovery.

FIG. 9 is a flowchart illustrating the steps performed by the TCM during error recovery. In Step 902, error registers are set to identify the failing units and indicate that fault recovery mode has been entered. In Step 904, the interfaces associated with the failing units are disabled. In Step 906, pending requests from the failing unit are processed. The manner in which these requests are processed depends on whether all data and address signals were received prior to the fault, and whether the address portion of a partially-received request has already been transferred to the MSU. Step 908 illustrates the sending of an error indication to the MSU. Next, the affected data by-pass paths are disabled, as shown in Step 910. Finally, the failing interfaces are conditioned for fault recovery mode, as illustrated in Step 912.

Figure 10:
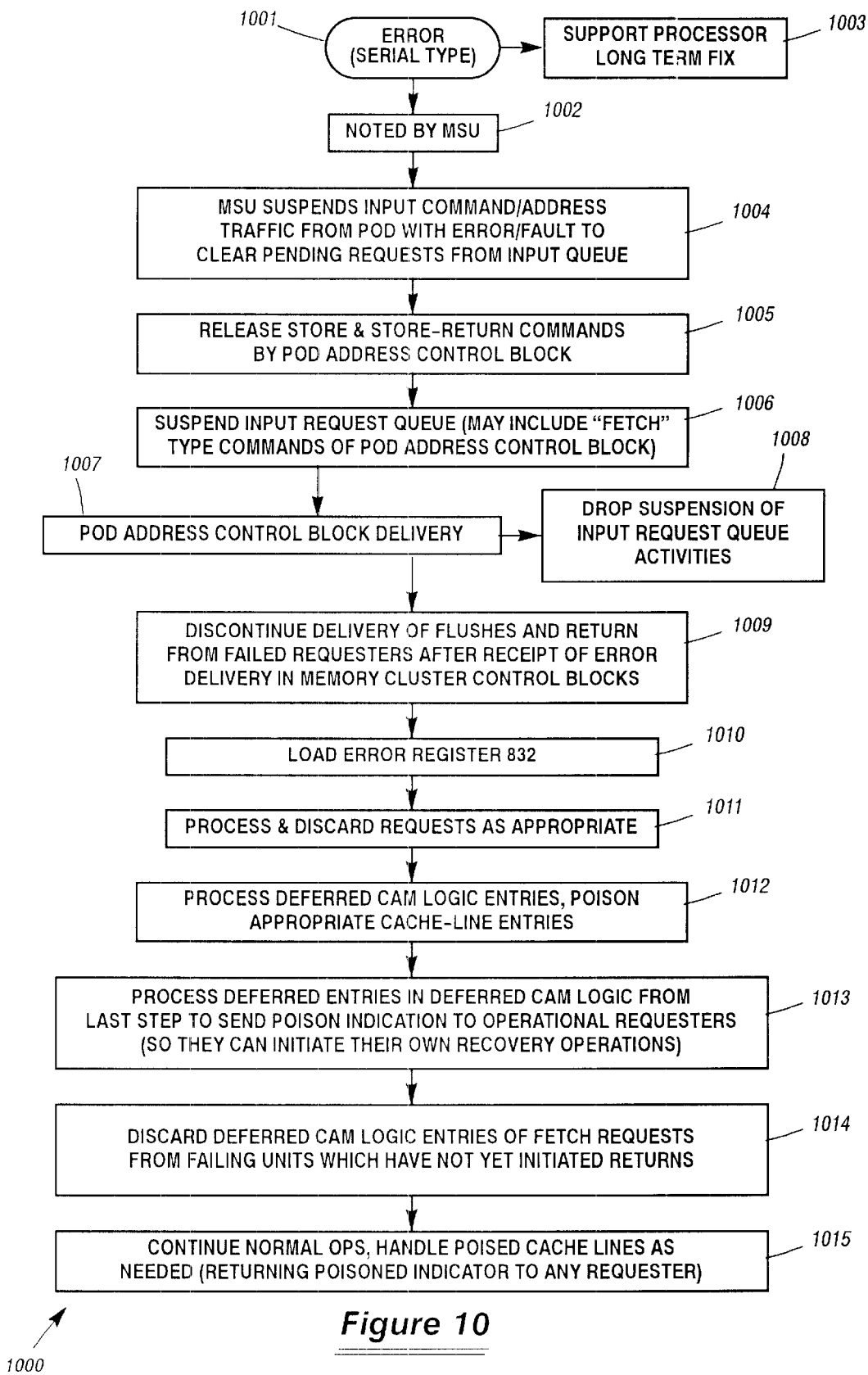
FIG. 10 is a flowchart illustrating the steps performed by the MSU during recovery of a serial error.

FIG. 10 is a flowchart 1000 illustrating the steps performed by the MSU during recovery of a serial error in accord with the preferred embodiment.

In step 1001, an Error indicates a fault in one of the units of a POD received by MSU. As described previously this could be a failed processor Sub-POD, or an I/O, and it is thought of as a "serial" error. All commands from failed requester have already been received by definition (for commands with associated data transfer, the data component of the request may or may not be completely clean, depending on when the TCM detected the requester error. The cache line of data to the MSU may have been complete without error, or partially to fully marked with data error indications.) Step 1003 may occur at any time, whereby the support processor will perform its operations to mark all cache lines owned by a failed requestor as poisoned, and after that is complete and this process 1000 is also complete, provide appropriate data to repair or replace failed requesters as noted elsewhere in this document. This process 1000 follows the path of step 1002, noting the error by the MSU.

In step 1004, the MSU suspends all input command traffic from the POD to assure that steps through 1007 can complete and the input queue be handled appropriately.

The POD Address Control Block releases all stores and store return commands as per normal processing in step 1005. Returns are first directed to use the POD-to-POD acceleration path if appropriate. Ultimately, all returns will be released to the Memory Cluster Control Block and be used to terminate deferred fetch processing as per normal sequencing.

Previous message commands, from a now-failed requester, currently in progress, are allowed to continue as per normal sequencing. Currently queued message commands from the failed requester are discarded. However, all message-acknowledge responses, delivered by the MSU to the source TCM when the MSU delivers the message to a destination TCM, are allowed to continue. This is done to maintain availability of the message communications path, between TCM and MSU, for operational requesters in the source TCM.

The POD Address Control Block input request queue is now also temporarily suspended (step 1006), in order to prepare for the next step of error delivery. It should be noted that fetch type commands (which include I/O Overwrites) that may still be contained in the input queue at this point. In step 1007, a POD Address Control Block Error Delivery sequence is activated. The POD Address Control Block communicates the appropriate requester error conditions to each of the Memory Cluster Control Blocks 720 via normal control signals, which are included in Lines 730. In the preferred embodiment, this is done by using a special command, internal to the MSU, that is called 'Return Error'. A 'Return Error' command includes encoded requester identification, which indicates the particular requester that has failed. Also at this time, the POD Address Control Block signals to its associated Return GRA 798 to discard any pending return operations directed to failing units, and to inhibit storing of any future return operations directed to a failed requester.

Also in step 1007, The POD Address Control Block terminates the error delivery sequence if no new requester errors were received during the above steps, otherwise will begin a new error delivery event to communicate the new errors.

When the POD Address Control Block error delivery sequence has terminated, the suspensions on the input request queue are dropped (step 1008), and requests may again be released from and received by the input request queue.

In step 1009, the Memory Cluster Control Block loads the 'Return Error' command into each of its expansion queues 804 through 810. This acts as an error marker for queued flushes and returns. All of the flushes/returns within the Queues, from currently failed requesters, that were received prior to the receipt of the error marker are processed in a normal manner. The TCM logic, in cooperation with the MSU POD Address Control Block ensure that no more flushes and returns from failed requesters will be delivered to the Memory Cluster Control Logic, after the Memory Cluster Control Block receives the error indication.

Now, in step 1010, the Memory Cluster Control Block loads the requester error indication specified by the 'Return Error' command into Error Register 832 (FIG. 8), which in the preferred embodiment is a storage device storing an error signal associated with each Sub-POD 210 and each I/O Module 140 in Platform 100. One or more of these error signals may be set at once to indicate the occurrence of multiple errors.

Logically it is now appropriate to process and discard requests as appropriate to the requests and the state of their requesters. Thus, in step 1011, queued Fetches received from failing units are discarded, as are queued I/O Return commands received from failing units. Queued I/O Overwrite commands received from failing units are processed normally (they will be poisoned when another operational requester asks for the cache line), and queued Return and Purge functions (due to fetch requests from operational units) to the failing unit(s) are executed normally.

Deferred CAM Logic entries are handled in accord with steps 1012, 1013 and 1014. In step 1012, Deferred CAM Logic entries associated with return operations to cache lines owned by failing unit(s) are processed. These entries are released to memory to set the state of the associated cache line to "error-state" (poison).

In step 1013, any deferred entries in Deferred CAM Logic that are requesting access to a cache line poisoned in the previous step are processed. Requests are released to memory so that the poison indication is retrieved and then returned to operational requesters to initiate recovery actions within these units.

In step 1014, entries from Deferred CAM Logic that are associated with Fetch requests from failing unit(s) and that have not yet initiated Return operations are discarded.

Step 1015, during and after the recovery process, allows requests from operational requesters to continue normally. A request for a cache line owned by a failing requester causes the state of the requested cache line to be set to "error-state" (poison), and returns the poison indication to the operational requester to initiate recovery actions.

Figure 11:
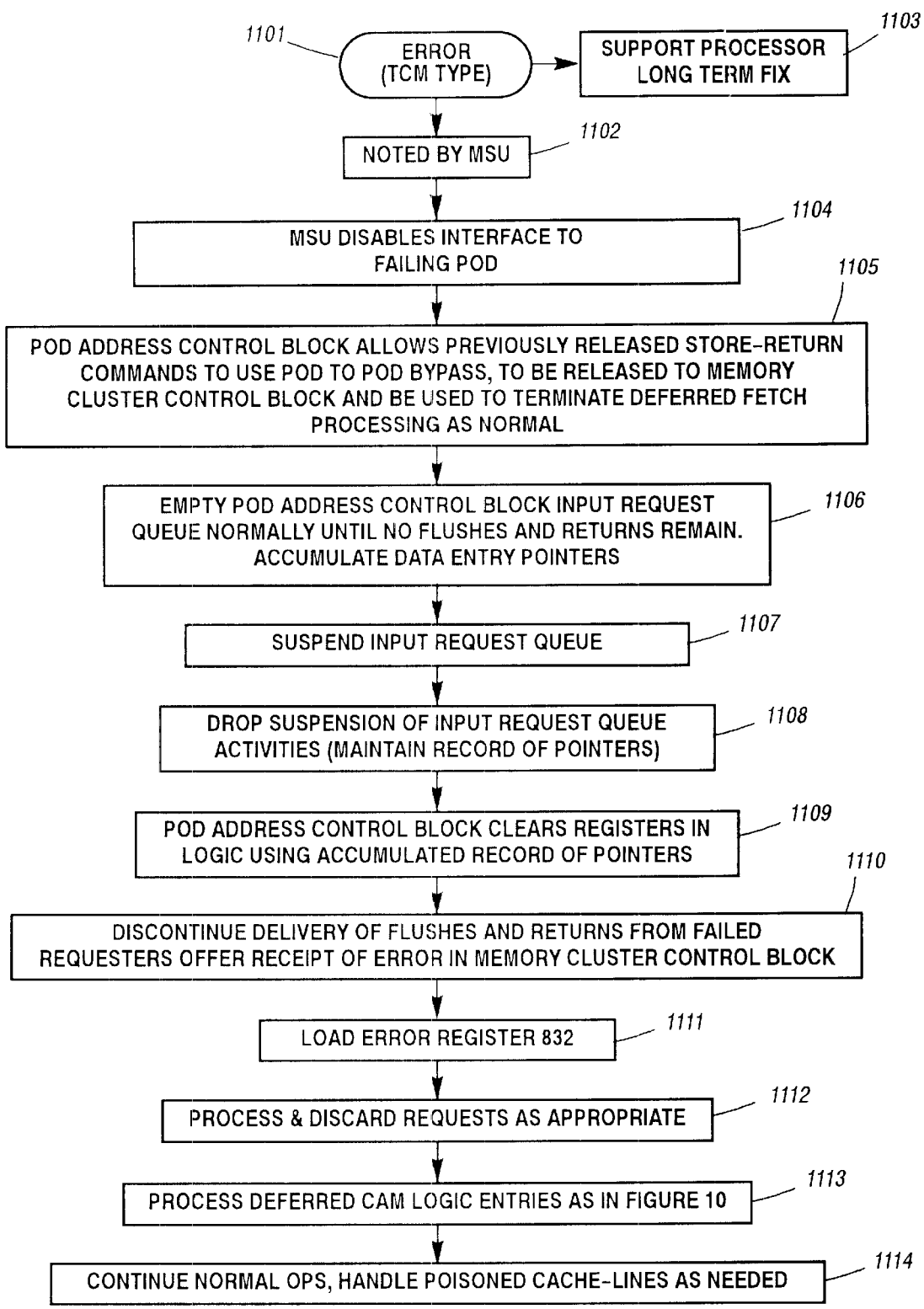
FIG. 11 is a flowchart illustrating the steps performed by the MSU during recovery of a TCM error.

FIG. 11 is a flowchart 1100 illustrating the steps performed by the MSU during recovery of a TCM error in the preferred embodiment. As in FIG. 10, the processes of the support processor can begin after the error is noted by the support processor, and in this illustration this is noted with a step 1103.

The process really starts when the TCM failure error is received or noted by MSU (Step 1102). This can occur due to a parity error in the command/address transfer detected by the MSU, or because of a TCM error indication, i.e., a poison line indicator from the failing TCM. For either cause, this step and the rest of the process 1100 preferably operates in the same manner.

All commands previously received that are awaiting an associated data transfer are provided internally with a pseudo data indication, in order to allow continued processing of the command.

The MSU disables its interface to the POD in step 1104, a more drastic step than suspending, since no part of the communications from the POD can be trusted after a TCM error is noted.

The POD Address Control Block in step 1105, allows previously released store return commands to were directed to use the POD-to-POD acceleration path to also be released to the Memory Cluster Control Block and be used to terminate deferred fetch processing as per normal sequencing.

Previous messages commands, from a now-failed TCM, currently in progress, are allowed to continue as per normal sequencing. Currently queued message commands from the failed TCM are discarded. However, all message-acknowledge responses, delivered by the MSU to the source TCM when the MSU delivers the message to a destination TCM, are allowed to continue. This is done to maintain availability of the message communications path within the MSU, in preparation for installation of replacement TCM hardware.

The POD Address Control Block input request queue is now allowed (step 1106) to empty out as per normal sequencing, until no flushes and returns remain in the input queue. All requests are discarded upon release. As requests with associated data are discarded, a record is accumulated of each associated data entry pointer that specifies the location of temporary storage within the POD Data Block 445 where the POD cache line is written.

The POD Address Control Block input request queue is now (step 1107) also temporarily suspended, in order to prepare for the next step of error delivery. It should be noted that fetch type commands (which include I/O Overwrites) may still be contained in the input queue at this point Also in step 1107, POD Address Block Error Delivery sequence is initiated. The POD Address Control Block communicates the appropriate requester error conditions to each of the Memory Cluster Control Blocks 720 via normal control signals, which are included in Lines 730. This is done by using a special command, internal to the MSU, that is called 'Return Error'. A 'Return Error' command includes encoded requester identification, which indicates the particular requester that has failed. In this case all requesters for the POD will be indicated as failed. Also at this time, the POD Address Control Block signals to its associated Return GRA 798 to discard any pending return operations directed to failing units, and to inhibit storing of any future return operations directed to a failed requester. Finally, any remaining requests within the POD Address Control Block are discarded.

When the POD Address Control Block error delivery sequence has terminated, the suspension on the input request queue is dropped (step 1108), and any remaining requests are allowed to empty out as per normal processing. All requests are discarded upon release. As requests with associated data (i.e. I/O Overwrites) are discarded, a record is accumulated of each associated data entry pointer.

The POD Address Control Block clears appropriate data resource control logic in 450, using the accumulated record of data entry pointers (step 1109).

In step 1110, the Memory Cluster Control Block loads the 'Return Error' command into each of its expansion queues 804 through 810. This acts as an error marker for queued flushes and returns. All of the flushes/returns within the Queues, from currently failed requesters, that were received prior to the receipt of the error marker are processed in a normal manner. The POD Address Control Block ensures by the discard processing above, that no more requests of any type from the failed requesters will be delivered to the Memory Cluster Control Logic, after the Memory Cluster Control Block receives the error indication.

In step 1111, the Memory Cluster Control Block loads the requester error indication specified by the 'Return Error' command into Error Register 832 (FIG. 8), which in the preferred embodiment is a storage device storing an error signal associated with each Sub-POD 210 and each I/O Module 140 in Platform 100. The error indications in the Error Register 832 reflect a failure with every unit associated with the failing TCM.

In step 1112, queued Fetches received from failing units are discarded as are queued I/O Return commands received from failing units. Queued I/O Overwrite commands received from failing units (they will be poisoned when another operational requester asks for the cache line) are processed normally, and queued Return and Purge functions (due to fetch requests from operational units) to the failing unit(s) are executed normally In step 1113, the same process as was described with respect to processing Deferred CAM Logic entries in steps 1011–1013 of FIG. 10 are performed.

Then, continuous normal processing, but handling any poisoned cache lines as needed occurs (step 1114).

During and after the recovery processes of flow charts 1000 and 1100, requests from operational requesters continue normally. A request for a cache line owned by a failing requester causes the state of the requested cache line to be set to "poison" and returns the poison indication to the operation requester to initiate recovery actions suitable to that requester. For example, intelligence can be built into the requester's software that enables more or less full recovery or adaptive recovery to the loss of the cache line. Any such requester receiving the poison indication can thus initiate such adaptive recovery if available.

While various embodiments of the present invention have been described above, it should be understood that they have been presented by way of example only, and not as a limitation. Thus, the breadth and scope of the present invention should not be limited by any of the above-described exemplary embodiments, but should be defined only in accordance with the following Claims and their equivalents.

What is claimed is:

1. Method for identifying memory locations in a shared main memory owned by a failing computer system element in a computer system having a plurality of computer system elements wherein only one of which computer system elements at any time may own data related to particular ones of said memory locations, but any of which computer system elements may request data related to any one of said memory locations at any time, comprising:

A. running said computer system and allowing all computer system elements that are not failing to operate relative to said shared memory, and during said running, identifying each memory location that is owned by a particular one of said computer system elements by marking that memory location as owned by said particular one of said computer system elements in a memory location directory, B. tracking all critical failure errors of each said computer system element, C. reporting critical failures to a main memory system error handling system that operates to support said shared main memory, D. identifying all memory locations in the shared main memory in said memory location directory owned by said failing computer system element by marking such memory locations so identified as poisoned, E. disabling any requests from said failing computer system element immediately subsequent to a said critical failure of said failing computer system element, and F. continuing running as in "A" except that data from each one of said memory locations that was marked as poisoned in said memory location directory are made unavailable to said computer system elements.

2. The method of claim 1 wherein step B includes tracking errors within processing units and errors between processing units and said main memory system.

3. The method of claim 1 wherein a memory location is a cache line.

4. The method of claim 1 wherein step F farther comprises, (i) monitoring of an error register system by a support processor, wherein said error register system indicates an error state for each computer system element, and (ii) updating memory location states in said memory location directory by said support processor.

5. The method of claim 4 wherein step F additionally further comprises:

(iii) isolating said failing computer system element from said computer system by said support processor, (iv) clearing said error indications from step (i) in said error register system by said support processor, and (v) reclaiming said poisoned memory locations in said memory location directory.

6. The method of claim 4 wherein the process of updating memory location states in step (iv) comprises, A. if a state indicator for a memory location is "present", not changing said state, B. if a state indicator for a memory location is "shared" or "I/O copy," causing said state indicator to be changed to a "present" state, C. if a state indicator for a memory location is "exclusive," causing said state indicator to be changed to a "present" state, unless said failing computer system element is indicated as owner of the memory location with said state indicator being "exclusive", and in such event, marking said location as "error-state", which can be called "poisoned."

7. The method of claim 6 further comprising:

A. if a state indicator for a memory location is "deferred", allowing a pending operation on said "deferred" memory location to complete in a normal manner if the request is not requesting a cache line owned exclusively by a failing computer system element and allowing the state of the memory location to resolve to "present" at the conclusion of the operation.

8. The method of claim 1 wherein subsequent to step C, an error handling process is invoked wherein if a state indicator for a memory location is "deferred" and said failing computer system element owns said deferred memory location, said deferred state is changed to poisoned.

9. The method of claim 1 wherein a process for handling faults comprises;
   A. if a said error is a TCM error, first shutting off new communications with said TCM, and then recovering, or,
   B. if said error is a serial error, first temporarily shutting off new communications with associated TCM, then initiating recovery, and then resuming communications with associated TCM to permit continuing use of operational requesters.

10. A method for use in a Symmetric Multiprocessor computer system having a main memory system and a system of POD units, wherein each said POD unit has a TCM unit for communicating with said main memory system through at least one port, and said POD unit may have at least one Sub-POD unit and wherein each POD unit further may have at least one I/O bus unit, and wherein said at least one Sub-POD unit and said at least one I/O bus unit communicate through said TCM with said main memory system, and wherein a failure state error system exists within said POD unit having an error bit identifying either a fail or a not-failed error state for each said Sub-POD unit and each I/O bus unit and for said TCM unit and wherein an error communications channel exists between said main memory system and said TCM unit to inform said main memory system of a current error state for each said error bit, and wherein said main memory system may be partitioned so that a portion of said main memory system may be shared within a partition and said portion of said shared main memory system within said partition is shared by more than one of said at least one Sub-POD units and said at least one I/O bus units, said method to allow continued operation of all units sharing said portion of said shared main memory system within a partition may continue to operate while a failing unit and any memory locations said failing unit owns are handled appropriately, said method comprising;
   A. monitoring said error bits by an error handling system in said main memory system,
   B. when an error bit indicates a filing unit that is not said TCM unit,
      1. disabling transceivers for said failing unit within said TCM unit,
      2. processing any pending requests from units as follows:
         a. if a pending request was received prior to said error bit indicating a failing unit, processing such said pending requests normally,
         b. if a data portion of a pending request was not received in said TCM unit prior to the error bit indicating a failing unit and no command/address portion of said request was sent to said main memory system over said at least one port, discarding said pending request.

11. A method as set forth in claim 10 further comprising a sub-step c in addition to sub-steps a and b of step B 2, comprising: if a data portion of a pending request was not received by said TCM unit prior to said error bit indicating a failing unit but associated command/address portions of said request were sent to said main memory system over said at least one port generating a data error over said port to said main memory system with a pseudo data packet to extinguish said request.

12. The method of claim 10 further comprising sending an indication of said error bit identifying said failing unit to said main memory system.

13. The method of claim 10 further comprising disabling by-pass data paths between said failing unit and other units.

14. The method of claim 10 further comprising processing Deferred CAM Logic entries associated with return operations to memory locations owned by said failing unit and releasing such Deferred CAM Logic entries to set the state of a memory directory entry to poisoned for associated memory locations.

15. The method of claim 14 further comprising processing deferred entries requesting access to a memory location that had their memory directory set to poisoned by releasing such requests to said memory system and thus returning poisoned status information to other units that are not failing, and initiating recovery actions which may be available in ones of said other units.

16. The method of claim 10, wherein if entries are made in a Return GRA buffer for tracking return operations through a by-pass operation but said return operations associated with said entries are not yet completed, for any of such entries are associated with return operations to failing units removing such entries from said Return GRA buffer.

17. The method of claim 10 further comprising:
   A. monitoring the error handling system by a support processor, and
   B. providing data for repair of the computer system based on said monitoring.

18. The method of claim 10 further comprising:
   A. monitoring the error handling system by a support processor, and
   B. initiating a recovery program in response to monitored errors by said support processor comprising:
      1. setting all cache lines to poisoned that were owned by a failed unit.

19. A method for use in a Symmetric Multiprocessor computer system having a main memory system and a system of POD units, wherein each said POD unit has a TCM unit for communicating with said main memory system through at least one port, and said POD unit may have at least one Sub-POD unit and wherein each POD unit further may have at least one I/O unit and wherein said at least one Sub-POD unit and said at least one I/O unit communicate through said TCM it with said main memory system, and wherein a failure state error system exists within said POD unit having an error bit identifying either a fail or a not-failed error state for each said Su&POD unit and each I/O unit and for said TCM unit, and wherein an error communications channel exists between said main memory system and said TCM unit to inform said main memory system of a current error state for each said error bit, and wherein said main memory system may be partitioned so that a portion of said main memory system may be shared within a partition and said shared portion of said main memory system within said partition is shared by more than one of said at least one Sub-POD units and said at least one I/O unit, said method to allow continued operation of all units sharing said shared portion of said main memory system memory within a partition may continue to operate while a failing unit and any memory locations said failing unit owns are handled appropriately, said method comprising;
   A. monitoring stud error bits by an error handling system in said main memory system,
   B. when an error bit indicates a failing unit that is said TCM unit disabling ports for communication between said TCM unit and said main memory system, and
   C. processing Deferred CAM Logic entries associated with return operations to memory locations owned by any said unit with a communication pathway through said failing TCM unit and releasing such Deferred CAM Logic entries to set the state of a memory directory entry to poisoned for associated memory locations.

20. The method of claim 19 wherein step B further comprises, processing any deferred entries in Deferred CAM Logic that are associated with a request requesting access to a memory location that had its memory directory set to poisoned by releasing such requests to said memory system and thus returning poisoned status information to other units that are not failing, and initiating recovery actions which may be available in ones of said other units.

21. The method of claim 19 further comprising bringing the TCM and associated POD Address Control Block(s) in the main memory system to an initialized state.

22. The method of claim 19 further comprising:
A. monitoring the error handling system by a support processor, and
B. providing data for repair of the computer system based on said monitoring.

23. The method of claim 19 further comprising:
A. monitoring the error handling system by a support processor, and
B. initiating a recovery program in response to monitored errors by said support processor comprising:
1. setting all cache lines to poisoned that were owned by a failed unit.

24. A method of setting memory locations in a main memory in a multiprocessor computer system with entries in a directory of said memory locations wherein said multiprocessor computer system has units, some of which may be faulty, and any of which may be specified owners of memory locations by an indication in said directory entries comprising:
A. monitoring an error handling system which detects faulty units for errors by a support processor,
B. initiating a recovery program in response to monitored errors by said support processor including setting all memory locations to poisoned where such memory locations are owned by said faulty units.

25. A poison line system for indicating failing units in a multiprocessor computer system said multiprocessor computer system having a main memory system comprising memory storage groups each with a set of memory locations, each of the memory locations having a record maintained in a memory directory, said multiprocessor computer system also having at least one POD unit having associated therewith a set of POD associated units, said set of POD associated units in said POD being: (a) up to a plurality of Sub-POD processor units, each Sub-POD processor unit having units associated therewith, said Sub-POD processor associated units being up to a plurality of processors, and (b) up to a plurality of I/O units; said POD unit also having (c) an associated communications and control block called a TCM wherein said TCM communicates between said Sub-POD and said I/O units and said memory storage groups across ports, said poison line system comprising:
A. error accumulating hardware within each of said units for generating an error signal of at least one bit of data on the occurrence of an error event,
B. error accumulating hardware within said TCM for accumulating said error signals from POD associated units,
C. error transfer hardware for continuously sending an error state related to error signals accumulated in said error accumulating hardware in said TCM to said main memory system,
D. error processor in said main memory system for handling said continuously sent error state from said TCM error transfer hardware.

26. The poison line system as set forth in claim 25 wherein said error processor has shut-off control over said TCM's port for terminating communications from said TCM when said error state indicates a failure of said TCM.

27. A poison line system as set forth in claim 25 wherein said TCM further comprises:
a TCM deferred output buffer for storing requests to communicate with said main memory system from said POD associated units, and an error handling system for marking with a poison marking, all requests in said TCM deferred output buffer from said TCM's POD associated units that generate an error signal as poisoned, after said error accumulating hardware within said TCM for accumulating said error signals from POD associated units receives such a generated error signal, and data signaling means to indicate to said main memory those requests in said TCM buffer are marked poisoned when said TCM sends those requests to said main memory system.

28. A poison line system as set forth in claim 25 wherein said main memory system further comprises: a deferred CAM Logic buffer for storing requests to communicate with said main memory system from said POD associated units, and an error handling system for marking in said memory directory with a poison marking, all requests in said deferred CAM Logic buffer from said TCM's POD associated units that generate an error signal as poisoned, after said error accumulating hardware within said TCM for accumulating has communicated said error signals to said main memory system.

29. A poison line system as set forth in claim 28 wherein said memory directory has a controller for distributing to said memory directory an indication of the poison marking for requests in said deferred CAM Logic buffer for associated locations in said main memory system.

30. A poison line system as set forth in claim 25 wherein said TCM error handling hardware disables all requests from a unit reporting an error subsequent to receiving said error indication in said TCM error accumulation hardware.

31. A poison line system as set forth in claim 27 wherein said main memory system memory directory is for storing information related to substantially each addressable memory location within said main memory system, and wherein said TCM deferred output buffer output can be controlled by the presence of a poisoned mark to send a cancel memory request subsequent to a memory request from a poisoned buffer line.

32. A poison line system as set forth in claim 25, wherein said computer system further comprises a support processor, wherein said TCM and said memory groups have associated therewith error registers accessible by said support processor, said error registers being addressable and readable by said support processor, and wherein said error registers contain a current indication of an error state of said TCM and said memory groups.

33. A memory system having controlling hardware configured to maintain a memory directory system which is referenced by said controlling hardware prior to servicing any memory request by an I/O or processing unit in a multiprocessor computer system wherein units within said multiprocessor computer system are able to maintain an ownership relationship with data in particular locations within said memory system with reference to ownership entries in said memory directory system, said memory directory system having a set of at least two entries for each memory location, a first entry for continuously updating and tracking a state of a single memory location within a computer system, and a second entry for continuously updating and tracking by maintaining a data signal identifying a unit having ownership of said single memory location whose state is tracked and maintained by said first entry, wherein said first entry comprises data signals differentiating at least the following memory location states:

A. a "present" state, indicating that data in the associated memory location in the memory system is currently owned by the memory system, the latest copy is held in the memory system, and the data available for use by any unit, B. a "shared" state, indicating that data in the associated memory location in the memory system is shared as a read-only copy by one or more Sub-POD/I/O units, C. an "exclusive" state, indicating that data in the associated memory location in the memory system is owned by a unit and must be recovered from said owning unit in order to obtain a valid copy of said data, D. an "I/O exclusive" state, indicating that the data in the associated memory location in the memory system is owned by an I/O unit, and E. an "error" or "poisons state", indicating that the data in the associated memory location in the memory system was owned by a failing unit at the time it was requested by an operational unit, and wherein said memory system controlling hardware references the first entry in said memory directory location and services a memory request based on the value of said first entry data signal associated with a memory location subject to said memory request, wherein if said data signal value indicates a "poison" state for an associated memory location, a memory location's data and a response signal are sent to the requester with the response signal indicating the state of the memory location's data as poisoned, and wherein if said data signal value associated with a memory location subject to a memory request indicates an "exclusive" state, said memory system controlling hardware requests a copy of data from a unit having an indication of ownership in said associated second entry to be sent to a unit making said request.

* * * * *